United States Patent
Solomon et al.

(10) Patent No.: US 11,516,410 B2
(45) Date of Patent: Nov. 29, 2022

(54) INPUT POLARITY OF COMPUTING DEVICE

(71) Applicant: Tangible Play, Inc., Palo Alto, CA (US)

(72) Inventors: Mark Solomon, San Jose, CA (US); Jerome Scholler, San Francisco, CA (US)

(73) Assignee: Tangible Play, Inc., Palo Alto, CA (US)

( * ) Notice: Subject to any disclaimer, the term of this patent is extended or adjusted under 35 U.S.C. 154(b) by 116 days.

(21) Appl. No.: 16/880,875

(22) Filed: May 21, 2020

(65) Prior Publication Data

US 2021/0004051 A1    Jan. 7, 2021

Related U.S. Application Data

(60) Provisional application No. 62/871,195, filed on Jul. 7, 2019.

(51) Int. Cl.
*G06F 3/01*     (2006.01)
*H04N 5/247*    (2006.01)
(Continued)

(52) U.S. Cl.
CPC .......... *H04N 5/247* (2013.01); *G06F 1/1626* (2013.01); *G06F 1/1637* (2013.01); *G06F 3/017* (2013.01);
(Continued)

(58) Field of Classification Search
CPC .... G06F 3/0346; G06F 3/04847; G06F 3/165; G06F 1/1626; G06F 1/1637; G06F 3/0482; H04R 3/04; H04R 2430/01
See application file for complete search history.

(56) References Cited

U.S. PATENT DOCUMENTS

D263,824 S    4/1982  Hagelbarger et al.
D282,935 S    3/1986  Shifflett
(Continued)

FOREIGN PATENT DOCUMENTS

WO    2006/027627 A1    3/2006
WO    PCT/US2020/04105  7/2020
WO    2021/007238 A1    1/2021

OTHER PUBLICATIONS

Zhaohui Wang et al., Polarity Detection in Ultrasound Current Source Density Imaging, Aug. 1, 2016, IEEE Xplore, pp. 1095-1098 (Year: 2016).*

(Continued)

*Primary Examiner* — Tam T Tran
(74) *Attorney, Agent, or Firm* — VLP Law Group LLP; Michel Bohn

(57) ABSTRACT

A computing device is described. In an example implementation, the computing device includes a housing including a display screen on a front surface, the housing and display screen being collectively positionable in a plurality of physical orientations, an input device that includes a first selection mechanism and a second selection mechanism, the first selection mechanism being actuatable to adjust a setting of an output of an application displayed on the display screen, the second selection mechanism being actuatable to adjust the setting of the output of the application displayed on the display screen, and an orientation sensor configured to determine which physical orientation of the plurality of physical orientations that the display screen is positioned in, and change a first input polarity of the first selection mechanism to correspond to the determined physical orientation of the display screen.

20 Claims, 12 Drawing Sheets

(51) Int. Cl.

| | | |
|---|---|---|
| *H04N 5/225* | (2006.01) | |
| *G06F 16/732* | (2019.01) | |
| *G06F 16/783* | (2019.01) | |
| *G06F 16/738* | (2019.01) | |
| *G09B 5/06* | (2006.01) | |
| *G09B 5/12* | (2006.01) | |
| *G06F 1/16* | (2006.01) | |
| *G06F 3/0482* | (2013.01) | |
| *H04R 3/04* | (2006.01) | |
| *G06V 30/413* | (2022.01) | |

(52) U.S. Cl.
CPC .......... *G06F 3/0482* (2013.01); *G06F 16/738* (2019.01); *G06F 16/7335* (2019.01); *G06F 16/783* (2019.01); *G06V 30/413* (2022.01); *G09B 5/06* (2013.01); *G09B 5/12* (2013.01); *H04N 5/2253* (2013.01); *H04R 3/04* (2013.01); *H04R 2430/01* (2013.01)

(56) References Cited

U.S. PATENT DOCUMENTS

| | | |
|---|---|---|
| D284,084 S | 6/1986 | Ferrara, Jr. |
| D289,291 S | 4/1987 | Kapper |
| D299,473 S | 1/1989 | Murphy |
| D299,491 S | 1/1989 | Masuda |
| D304,338 S | 10/1989 | Sermon |
| D310,521 S | 9/1990 | Leung |
| D312,533 S | 12/1990 | Rolfs |
| D313,409 S | 1/1991 | Chowdhree et al. |
| D321,175 S | 10/1991 | Tsuchiya |
| D322,777 S | 12/1991 | Nishio |
| D324,210 S | 2/1992 | Vossoughi et al. |
| D333,814 S | 3/1993 | Swanson et al. |
| D336,053 S | 6/1993 | Hayes et al. |
| D346,618 S | 5/1994 | Holmes |
| D352,279 S | 11/1994 | Foy et al. |
| D361,784 S | 8/1995 | Saddler et al. |
| D362,270 S | 9/1995 | Allen |
| D362,662 S | 9/1995 | Baudot |
| D366,499 S | 1/1996 | Fung |
| D370,892 S | 6/1996 | Shima et al. |
| D373,576 S | 9/1996 | Liggett |
| D374,224 S | 10/1996 | Starck |
| D380,231 S | 6/1997 | Chow |
| D384,659 S | 10/1997 | Suzuki |
| D388,065 S | 12/1997 | Kawauchi et al. |
| D393,461 S | 4/1998 | Goto |
| D395,458 S | 6/1998 | Smith et al. |
| D396,217 S | 7/1998 | Suzuki |
| D411,517 S | 6/1999 | Lin |
| D413,595 S | 9/1999 | Arie |
| D426,816 S | 6/2000 | Lucente et al. |
| D429,068 S | 8/2000 | Kleinsmith |
| 6,175,954 B1 | 1/2001 | Nelson et al. |
| D437,593 S | 2/2001 | Keeler et al. |
| D458,255 S | 6/2002 | Hsu |
| D459,394 S | 6/2002 | Obadiaru et al. |
| D496,034 S | 9/2004 | Guerrera et al. |
| D517,512 S | 3/2006 | Peng |
| D524,312 S | 7/2006 | Young |
| D533,857 S | 12/2006 | Bradley |
| 7,181,363 B2 | 2/2007 | Ratti et al. |
| D546,895 S | 7/2007 | Chan |
| D563,405 S | 3/2008 | Taniho et al. |
| D576,177 S | 9/2008 | Asanuma et al. |
| D578,131 S | 10/2008 | Horito et al. |
| D597,057 S | 7/2009 | Sheppard |
| D599,328 S | 9/2009 | Derocher et al. |
| D600,689 S | 9/2009 | Jen |
| D607,883 S | 1/2010 | Fujita et al. |
| 7,777,899 B1 | 8/2010 | Hildreth |
| D624,535 S | 9/2010 | Tsai et al. |
| D634,316 S | 3/2011 | Van Den Nieuwenhuizen |
| D638,019 S | 5/2011 | Weisshaupt |
| D641,749 S | 7/2011 | Leung et al. |
| D642,174 S | 7/2011 | Hirota |
| 8,019,121 B2 | 9/2011 | Marks et al. |
| D654,450 S | 2/2012 | McManigal et al. |
| 8,126,264 B2 | 2/2012 | Kaftory et al. |
| D660,736 S | 5/2012 | Lee et al. |
| D660,837 S | 5/2012 | Libman et al. |
| D662,089 S | 6/2012 | Gougherty et al. |
| D663,638 S | 7/2012 | Lee et al. |
| D665,687 S | 8/2012 | Lee et al. |
| 8,274,535 B2 | 9/2012 | Hildreth et al. |
| D669,049 S | 10/2012 | Harper et al. |
| D671,112 S | 11/2012 | Harper et al. |
| D674,801 S | 1/2013 | Wharram |
| D676,900 S | 2/2013 | Ohno et al. |
| D678,239 S | 3/2013 | Bourne et al. |
| D679,018 S | 3/2013 | Fullerton et al. |
| D688,249 S | 8/2013 | Wharram |
| D693,314 S | 11/2013 | McKeage et al. |
| D696,403 S | 12/2013 | Noguchi et al. |
| 8,611,587 B2 | 12/2013 | Horovitz |
| D697,060 S | 1/2014 | Yang |
| D697,506 S | 1/2014 | Bianco et al. |
| D697,910 S | 1/2014 | Bianco et al. |
| 8,624,932 B2 | 1/2014 | Hildreth et al. |
| D702,579 S | 4/2014 | Lee et al. |
| D704,693 S | 5/2014 | Kim |
| D708,184 S | 7/2014 | Romanoff et al. |
| D718,308 S | 11/2014 | Nishizawa |
| D721,665 S | 1/2015 | Klepper et al. |
| D732,533 S | 6/2015 | Hirota |
| D733,714 S | 7/2015 | Ballou et al. |
| 9,152,173 B2 | 10/2015 | Lee et al. |
| 9,158,389 B1 | 10/2015 | Sharma et al. |
| 9,160,915 B1 * | 10/2015 | Davies .................... G06F 3/023 |
| D742,371 S | 11/2015 | Bopp et al. |
| 9,235,768 B1 | 1/2016 | Pashintsev et al. |
| D753,125 S | 4/2016 | Hsu et al. |
| D755,783 S | 5/2016 | SHI et al. |
| 9,350,951 B1 | 5/2016 | Rowe |
| D760,248 S | 6/2016 | Suarez |
| D766,288 S | 9/2016 | Lee et al. |
| 9,472,113 B1 | 10/2016 | Hwang et al. |
| D778,982 S | 2/2017 | Beatty et al. |
| D789,969 S | 6/2017 | Chaudhri et al. |
| D798,378 S | 9/2017 | Kim |
| D807,884 S | 1/2018 | Blanchette et al. |
| D810,088 S | 2/2018 | Moore et al. |
| D812,622 S | 3/2018 | Moon |
| D816,081 S | 4/2018 | Rosenberg et al. |
| 9,939,961 B1 | 4/2018 | Sharma et al. |
| 10,003,371 B1 | 6/2018 | Given et al. |
| D824,406 S | 7/2018 | Cordova et al. |
| 10,033,943 B1 | 7/2018 | Sharma et al. |
| D825,596 S | 8/2018 | Cannata |
| D827,651 S | 9/2018 | Brown et al. |
| 10,083,356 B2 | 9/2018 | Sharma et al. |
| D830,868 S | 10/2018 | Kress et al. |
| D834,573 S | 11/2018 | Pell et al. |
| D839,275 S | 1/2019 | Moore et al. |
| D844,010 S | 3/2019 | Owens et al. |
| D849,741 S | 5/2019 | Wei |
| D850,440 S | 6/2019 | Gentle et al. |
| D852,211 S | 6/2019 | Choi et al. |
| D852,801 S | 7/2019 | Dukerschein et al. |
| D854,565 S | 7/2019 | McLaughlin et al. |
| D857,007 S | 8/2019 | Pitallano et al. |
| D860,233 S | 9/2019 | Chaudhri et al. |
| D871,500 S | 12/2019 | Balar |
| D873,819 S | 1/2020 | Harsacky |
| D877,747 S | 3/2020 | Belliveau |
| D880,327 S | 4/2020 | Costabile et al. |
| D882,598 S | 4/2020 | Belliveau |
| D902,202 S | 11/2020 | Fung et al. |
| D907,032 S | 1/2021 | Solomon |
| D908,122 S | 1/2021 | Luo |
| D919,653 S | 5/2021 | Everette et al. |
| D920,326 S | 5/2021 | Solomon |

(56) References Cited

U.S. PATENT DOCUMENTS

| | | |
|---|---|---|
| D929,398 S | 8/2021 | Lin |
| 2005/0276164 A1 | 12/2005 | Amron |
| 2006/0115113 A1 | 6/2006 | Lages et al. |
| 2007/0101544 A1 | 5/2007 | Hsieh et al. |
| 2008/0018595 A1 | 1/2008 | Hildreth et al. |
| 2009/0273560 A1 | 11/2009 | Kalanithi et al. |
| 2009/0315740 A1 | 12/2009 | Hildreth et al. |
| 2010/0066763 A1 | 3/2010 | MacDougall et al. |
| 2010/0091110 A1 | 4/2010 | Hildreth |
| 2011/0191692 A1 | 8/2011 | Walsh et al. |
| 2011/0199319 A1 | 8/2011 | Moser |
| 2011/0298724 A1 | 12/2011 | Ameling et al. |
| 2011/0316767 A1 | 12/2011 | Avrahami |
| 2012/0026098 A1* | 2/2012 | Ladouceur ............ G06F 1/1684 345/173 |
| 2012/0043235 A1 | 2/2012 | Klement |
| 2012/0229590 A1 | 9/2012 | Barrus |
| 2012/0244922 A1 | 9/2012 | Horovitz |
| 2013/0147836 A1 | 6/2013 | Small et al. |
| 2013/0201185 A1 | 8/2013 | Kochi |
| 2013/0206614 A1 | 8/2013 | O'Neill et al. |
| 2013/0229773 A1 | 9/2013 | Siddiqui et al. |
| 2013/0313142 A1 | 11/2013 | Wen |
| 2013/0321447 A1 | 12/2013 | Horovitz et al. |
| 2014/0118584 A1 | 5/2014 | Lee et al. |
| 2014/0125580 A1 | 5/2014 | Eun et al. |
| 2014/0176530 A1 | 6/2014 | Pathre |
| 2014/0223279 A1 | 8/2014 | Algreatly |
| 2014/0300642 A1 | 10/2014 | Laine et al. |
| 2014/0365875 A1 | 12/2014 | De et al. |
| 2014/0379942 A1* | 12/2014 | Perek .................... G06F 1/1686 710/14 |
| 2015/0072335 A1 | 3/2015 | Pedanekar et al. |
| 2015/0084855 A1 | 3/2015 | Song et al. |
| 2015/0124396 A1 | 5/2015 | Ivanchenko |
| 2015/0138385 A1 | 5/2015 | Kim |
| 2015/0172539 A1 | 6/2015 | Neglur |
| 2015/0187225 A1 | 7/2015 | Worsley |
| 2015/0220806 A1 | 8/2015 | Heller et al. |
| 2015/0222315 A1 | 8/2015 | O'Neill et al. |
| 2015/0339532 A1 | 11/2015 | Sharma et al. |
| 2015/0363003 A1 | 12/2015 | Henriz |
| 2016/0239048 A1 | 8/2016 | Mehandjiysky et al. |
| 2016/0378296 A1 | 12/2016 | Mishra et al. |
| 2017/0132676 A1 | 5/2017 | Mediratta et al. |
| 2017/0169598 A1 | 6/2017 | York et al. |
| 2017/0206693 A1 | 7/2017 | Sharma et al. |
| 2017/0230585 A1 | 8/2017 | Nash et al. |
| 2017/0311053 A1 | 10/2017 | Ganjam et al. |
| 2017/0344127 A1 | 11/2017 | Hu et al. |
| 2018/0299996 A1 | 10/2018 | Kugler et al. |
| 2019/0075272 A1 | 3/2019 | Horio et al. |
| 2019/0080173 A1 | 3/2019 | Sharma et al. |
| 2019/0104373 A1* | 4/2019 | Wodrich ................ G06F 3/165 |
| 2019/0156119 A1 | 5/2019 | Sharma et al. |
| 2019/0206126 A1 | 7/2019 | Solomon et al. |
| 2019/0313540 A1 | 10/2019 | Solomon et al. |
| 2019/0347946 A1 | 11/2019 | Beck et al. |
| 2020/0019575 A1 | 1/2020 | Farrell et al. |
| 2020/0026737 A1 | 1/2020 | Brown et al. |
| 2020/0143567 A1 | 5/2020 | Dukerschein et al. |
| 2021/0004405 A1 | 1/2021 | Solomon et al. |
| 2021/0006730 A1 | 1/2021 | Solomon et al. |

OTHER PUBLICATIONS

Ying-Yun Chen et al., Research of an Intelligent Auto-Controlling System for LCD Screen Flicker, May 9, 2016, IEEE Xplore Journal of Display Technology, vol. 12, No. 6, pp. 557-561 (Year: 2016).*

Diego Moya, "Tangible user interface", http://en.wikipedia.org/w/index.php?title=Tangible.sub.—user.sub.—inter-face&oldid=549052909, Apr. 6, 2013, (5 pages).

Extended European Search Report, EP 15796779.5, dated Dec. 7, 2017 (10 pages).

International Search Report and Written Opinion for PCT/US2015/032041, dated Aug. 27, 2015 (14 pages).

International Search Report and Written Opinion received for PCT Patent Application No. PCT/US2019/060341, dated Jan. 27, 2020, 11 pages.

Khandelwal et al., "Teaching Table: Tangible Mentor for Pre-K Math Education," 1st International Conference on Tangible and Embedded Interaction, Feb. 15, 2007 (4 pages).

Lochtefeld et al., "Little Projected Planet: An Augmented Reality Game for Camera Projector Phones," Jan. 1, 2010 (4 pages).

Mueller et al., "A Physical Three-Way Interactive Game Based on Table Tennis," Interaction Design Group, Department of Information System, The University of Melbourne Australia, Dec. 3, 2007 (7 pages).

Pedersen, "Grab and Touch: Empirical Research on Tangible Computing and Touch Interaction", University of Copenhagen, Denmark, Department of Computer Science, Faculty of Science, Nov. 2012 (75 pages).

Article entitled "Integrated Textbook: Augmenting Paper Textbooks with Digital Learning Support Using Digital Pens", by Chuang et al., dated 2006 (Year: 2006).

Article entitled "Pustack—Towards and augmented, scalable and personalized interface for paper textbooks", dated Sep. 27, 2013, by Ghandi et al. (Year: 2013).

Article entitled "Reflex: Adaptive Learning Beyond the Screen", by Gelsomini etal., dated Mar. 29, 2019 (Year: 2019).

Article entitled "Textbook Information Sharing Method based on ISBN Augmented Reality", dated 2013, by Choel (Year: 2013).

Article entitled "Tica: An Environment for Exploring Tangible vs Screen-Based Programming", by Wilkie etal., dated 2017 (Year:2017).

Article entitled Augmented Paper System: A Framework for User's Personalized Workspace, dated 2013, by Bhardwaj et al. (Year: 2013).

First Examination Report of Indian Design Application No. 325417-001, dated Feb. 21, 2020 (2 pages).

International Search Report and Written Opinion, PCT/US20/41057, dated Nov. 20, 2020 (12 pages).

Jankovic et al., "Developing a modular active spherical vision system", In: Proceedings of the 2005 IEEE International Conference on Robotics and Automation, Jan. 2005, Retrieved on Oct. 24, 2020 (Oct. 24, 2020) from <https://www.researchgate.net/profile/Michael_Naish/publication/221072996_Developing_a_Modular_Active_Spherical_Vision_System/links/02e7e53ac59d019aae000000/Developing-a-Modular-Active-Spherical-Vision-System.pdf>.

Outgoing—ISA/210—International Search Report dated Sep. 28, 2020 for WO Application No. PCT/US20/041066.

Outgoing Written Opinion of the ISA dated Sep. 28, 2020 for WO Application No. PCT/US20/041066.

PCT Application No. PCT/US2020/004105, dated Jul. 7, 2020, by Tangible Play, Inc.

YouTube video entitled "Getting Creative with Osmo Monster", uploaded on Jul. 28, 2016, available at https://www.youtube.com/watch?v=PBEQfnbiBoQ), by Osmo (Year: 2016).

YouTube video entitled "It Worked: Osmo Coding Awbie #HopIntoCoding", uploaded on Mar. 20, 2018, available at https://www.youtube.com/watch?v=I3HD20PBKks, by Gonzales (Year: 2018).

YouTube video entitled "Unboxing & Lets Playi-Osmo Coding Jam & Coding Duo!—Full Review!", uploaded on Jan. 31, 2018, available athttps://www.youtube.com/watch?v=yPz6MJ2xaE4, by KhanFlicks (Year: 2018).

Article entitled "Active Visitor: Augmenting Libraries into Social Spaces", by Koukopoulos et al., dated 2018 (Year: 2018).

Article entitled "Live Texturing of Augmented Reality Characters from Colored Drawings", by Magnenat et al., dated Nov. 2015 (Year: 2015).

Visual Augmentation of Printed Material with Intelligent See-through Glass Displays: A Prototype based on Smartphone and Pepper's Ghost, by Sandnes et al., dated 2018 (Year: 2018).

* cited by examiner

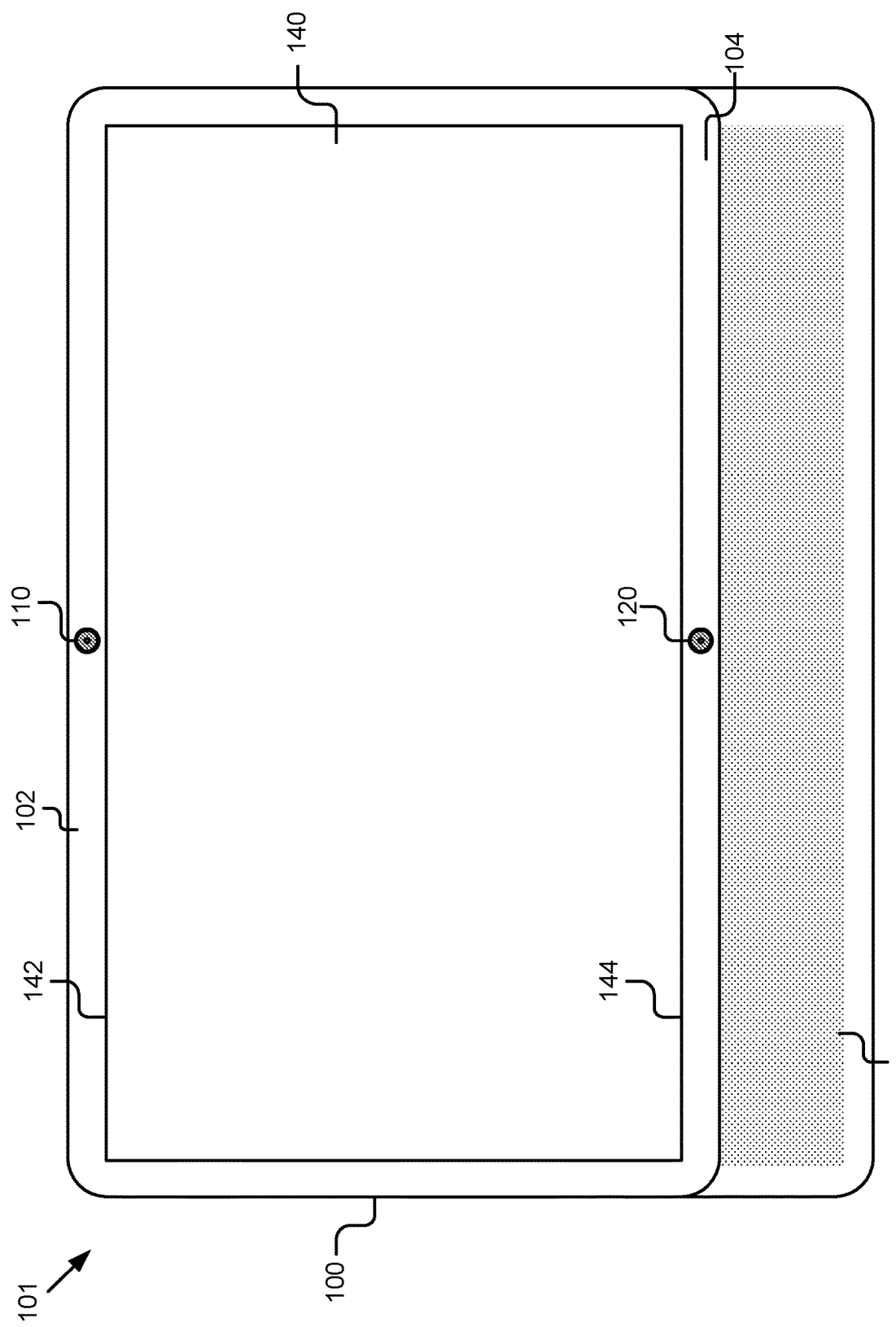

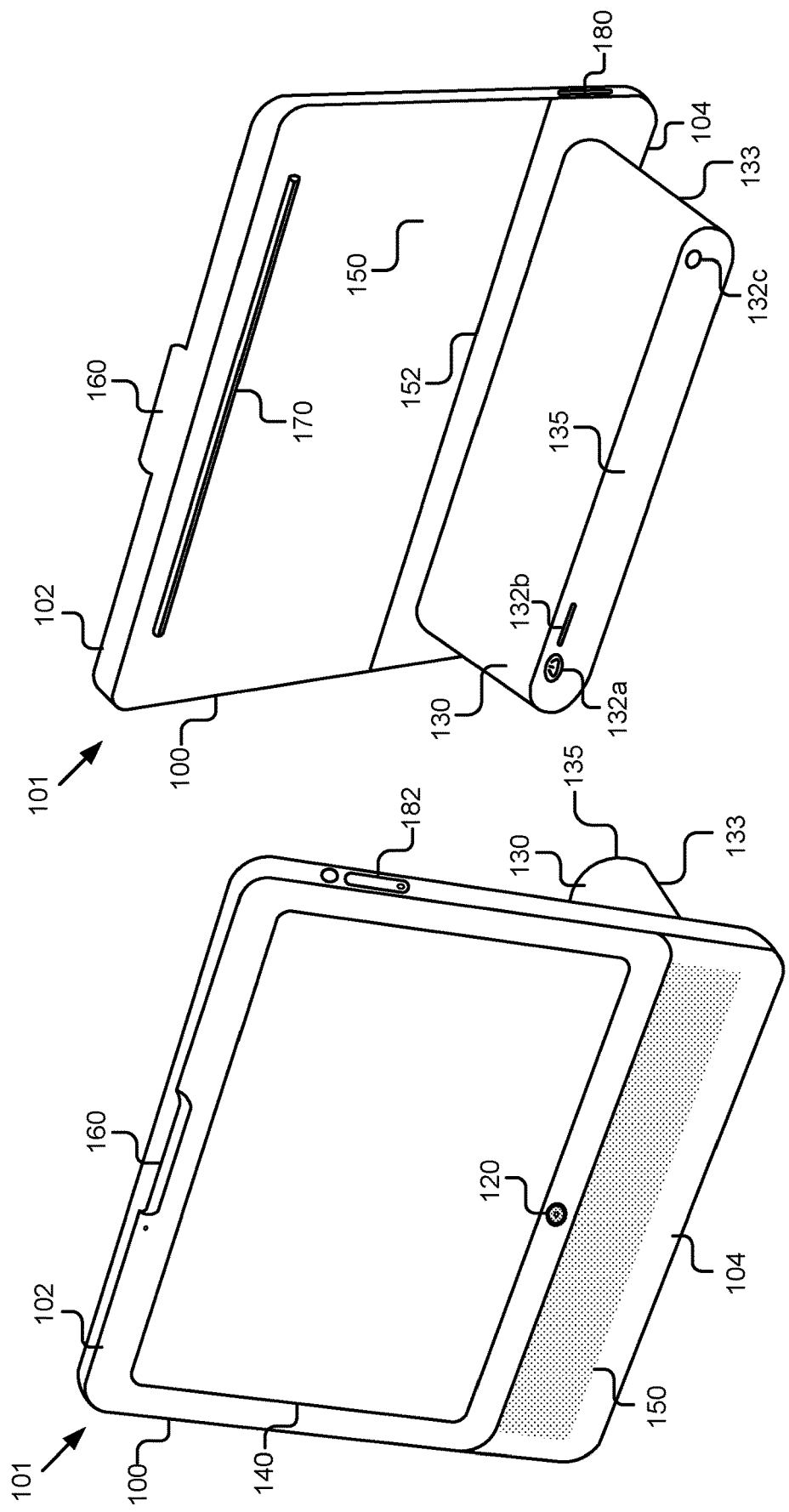

INPUT POLARITY OF COMPUTING DEVICE

BACKGROUND

The present disclosure relates to a computing device.

An electronic device often has cameras for capturing videos or images. Common examples of cameras of the electronic device usually include a front camera to capture objects in front of the electronic device and a back camera to capture objects behind the electronic device. To capture an image or a video of an object, a user often needs to manually select to use either the front camera or the back camera based on a location of the object relative to the electronic device. The selected camera may then capture the object and the non-selected camera may not be utilized. In addition, the electronic device often includes various input/output elements and the position of the input/output elements relative to the user may change when the electronic device is situated in different positions. Therefore, the electronic device often requires the user to memorize the functionality associated with each input/output element and accurately localize the desired input/output element to interact with the electronic device. As a result, the electronic device is usually inconvenient for the user to use, especially for the young children and the elderly.

SUMMARY

According to one innovative aspect of the subject matter in this disclosure, a computing device is described. The computing device includes a housing including a display screen on a front surface, the housing and display screen being collectively positionable in a plurality of physical orientations; an input device that includes a first selection mechanism and a second selection mechanism, the first selection mechanism being actuatable to adjust a setting of an output of an application displayed on the display screen, the second selection mechanism being actuatable to adjust the setting of the output of the application displayed on the display screen; and an orientation sensor configured to determine which physical orientation of the plurality of physical orientations that the display screen is positioned in, and change a first input polarity of the first selection mechanism to correspond to the determined physical orientation of the display screen.

Implementations may include one or more of the following features. The computing device where the orientation sensor is further configured to change a second input polarity of the second selection mechanism to correspond to the determined physical orientation of the display screen. The physical orientation of the plurality of physical orientations is one of a first orientation and a second orientation. When the display screen is situated in the first orientation, the display screen is situated in a first viewing position and the input polarity of the first selection mechanism is actuatable to increase the setting of the output of the application displayed on the display screen; and when the display screen is situated in the second orientation, the display screen is situated in a second viewing position and the input polarity of the first selection mechanism is actuatable to decrease the setting of the output of the application displayed on the display screen. When the display screen is situated in the first orientation, the display screen is situated in a first viewing position and the input polarity of the second selection mechanism is actuatable to decrease the setting of the output of the application displayed on the display screen; and when the display screen is situated in the second orientation, the display screen is situated in a second viewing position and the input polarity of the second selection mechanism is actuatable to increase the setting of the output of the application displayed on the display screen. The setting is a volume setting and the first orientation is a substantially vertical orientation and when the display screen is situated in the first orientation, the first selection mechanism is identified as a top selection mechanism, the first selection mechanism is actuatable to increase the volume setting, and the second selection mechanism is identified as a bottom selection mechanism, the second selection mechanism is actuatable to decrease the volume setting. The setting is a volume setting and the second orientation is a substantially horizontal orientation and when the display screen is situated in the second orientation, the first selection mechanism is identified as a bottom selection mechanism, the first selection mechanism is actuatable to decrease the volume setting, and the second selection mechanism is identified as a top selection mechanism, the second selection mechanism is actuatable to increase the volume setting. The display screen is configured to present a graphical user interface that includes a virtual volume interface, the virtual volume interface signaling how the input device is configured. When the display screen is positioned in the first orientation, the virtual volume interface depicts that the input polarity of the first selection mechanism will increase the setting and selecting the second selection mechanism will decrease the setting; and when the display screen is positioned in the second orientation, the virtual volume interface depicts that the input polarity of the first selection mechanism will decrease the setting and selecting the second selection mechanism will increase the setting. The display screen is further configured to present the virtual volume interface to slidably appear from an edge of the display screen that corresponds to a location of the input device on the housing based on whether the display screen is in the first orientation or the second orientation. The setting is a volume setting, the computing device may include: an audio output device, the audio output including a first audio output device and a second audio output device, the volume setting being configured to adjust the volume being output using the audio output, the audio output being configured to output a first audio feed and a second portion of the audio feed. When the display screen is positioned in the first orientation, the first audio feed is sent to the first audio output device and the second audio feed is sent to the second audio output device; and when the display screen is positioned in the second orientation, the second audio feed is sent to the first audio output device and the first audio feed is sent to the second audio output device. The setting is one of a volume setting, a brightness setting, a screen dimension setting, and an input sensitivity setting. The input device is a volume control device to adjust a volume of the setting of the output of the computing device.

The method also includes determining that a computing device is positioned in a first orientation on a physical surface, where the computing device includes a display screen positioned in a first viewing position and an input device that includes a first selection mechanism and a second selection mechanism, the first selection mechanism being actuatable to adjust a setting of the computing device, the second selection mechanism being actuatable to adjust the setting of the computing device; receiving a first input from the first selection mechanism; adjusting the setting of the computing device to increase the setting based on the first input from the first selection mechanism; determining that the computing device has been positioned in a second orientation on the physical surface, where the display screen is positioned in a second viewing position and an input polarity of the first selection mechanism has been updated; receiving a second input from the first selection mechanism; and updating the setting of the computing device to decrease the setting based on the second input from the first selection mechanism.

The method where adjusting the setting of the computing device to increase the setting based on the first input from the first selection mechanism further may include: determining that the computing device is currently positioned in the first orientation; mapping the input polarity of the first selection mechanism to increase the setting; mapping the input polarity of the second selection mechanism to decrease the setting; and updating the setting of the computing device based the mapping when the first input is received. Updating the setting of the computing device to decrease the setting based on the second input from the first selection mechanism further may include: determining that the computing device is currently positioned in the second orientation; mapping the input polarity of the first selection mechanism to decrease the setting; mapping the input polarity of the second selection mechanism to increase the setting; and updating the setting of the computing device based the mapping when the second input is received. The method may include: detecting an interaction with the input device; and displaying on the display screen a virtual volume interface graphic that represents a current configuration of the input device responsive to detecting the interaction.

The computing device also includes a housing including a display screen on a front surface, the housing and display screen being collectively positionable in one of a first orientation and a second orientation; an orientation sensor configured to determine whether the housing and display screen are collectively positioned in the first orientation or the second orientation; and change an input polarity of a volume control input device to correspond to the determined orientation; and the volume control input device located on a side surface of the housing, the volume control input device includes a first selection mechanism and a second selection mechanism, the first selection mechanism being actuatable to adjust a setting of the computing device, the second selection mechanism being actuatable to adjust the setting of the computing device, where: when the housing and display screen are determined to be collectively positioned in the first orientation, the input polarity of the volume control input device is identified as the first selection mechanism is actuated to increase the setting of the computing device and the second selection mechanism is actuated to decrease the setting of the computing device; and when the housing and display screen are determined to be collectively positioned in the second orientation, the input polarity of the volume control input device is identified as the first selection mechanism is actuated to decrease the setting of the computing device and the second selection mechanism is actuated to increase the setting of the computing device.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 1A is a front view of an example computing device.

FIGS. 1B and 1C respectively illustrate perspective views of an example computing device from a front perspective and a rear perspective.

DETAILED DESCRIPTION

Figure 2A:
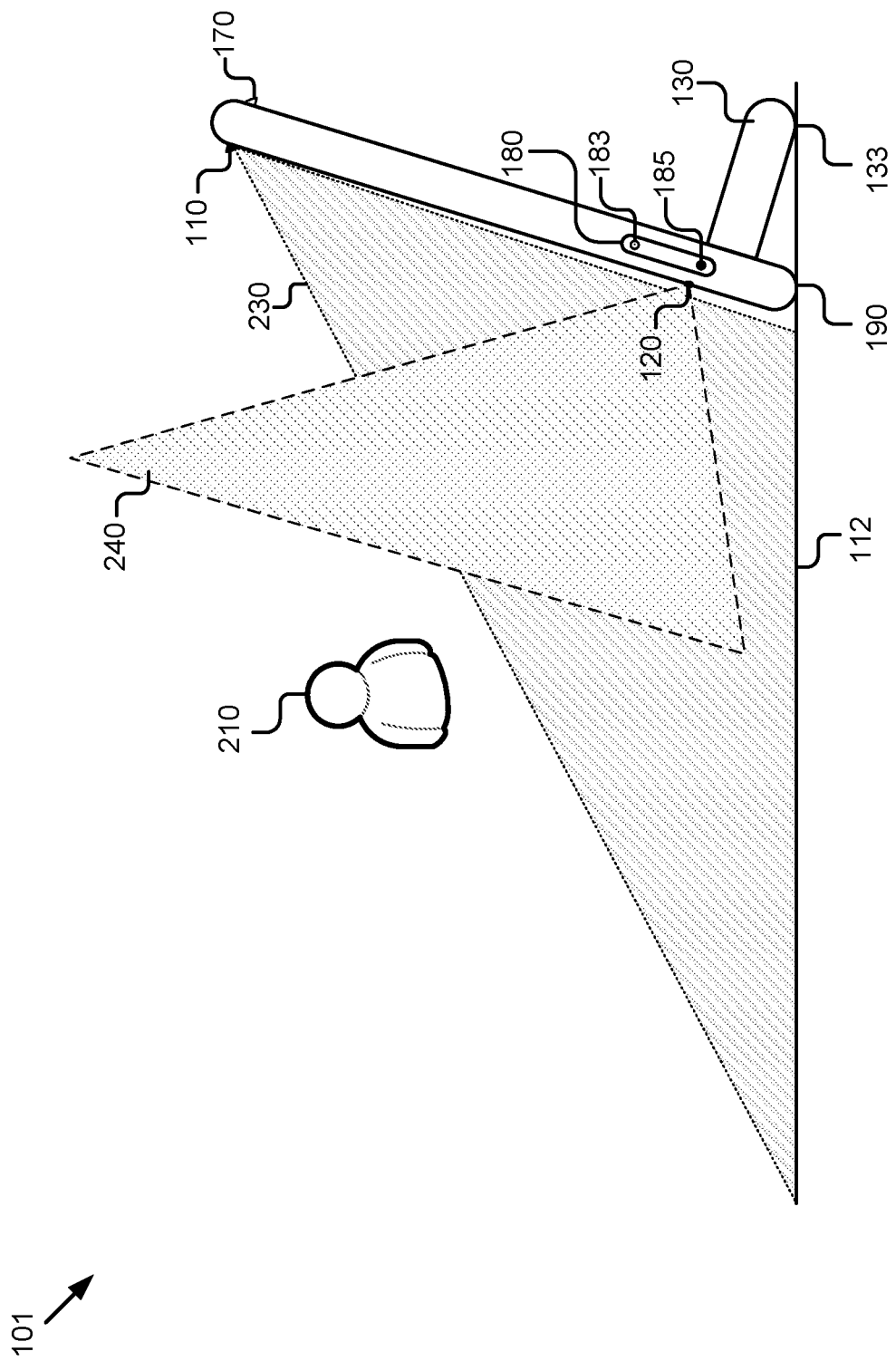
FIG. 2A illustrates a side view of a computing device in a first orientation and depicts fields of view of a first camera and a second camera.

FIGS. 1A-1C illustrate an example computing device 100 that includes a first camera 110 and a second camera 120 that are capable of operating simultaneously to capture video streams of different fields of view. For example, a field of view of the first camera 110 may be pointing downward towards a surface in front of the computing device where a user may be placing one or more tangible objects and the field of view of the second camera may be directed outwards from a display screen 140 on the computing device 100 towards a user viewing the display screen 140. By using the first camera 110 and the second camera 120, the computing device 100 may be able to see both what objects a user places in front of the computing device 100 and what the user is doing at the same time (such as capturing facial expressions, speech, gestures, etc.).

In some implementations, the computing device 110 may be positionable in different orientations and the field of view of the first camera 110 and the second camera 120 may be different relative to the surface the computing device 110 is positioned on in the different orientations. For example, a first orientation 101, as shown in FIGS. 1A-1C may be a substantially upright position and the field of view of the first camera 110 may be downwards towards a surface in front of the computing device 100. In another example, a second orientation 103, as shown in FIG. 2B, may be substantially flat or horizontal in position (e.g., resting substantially flat on a surface) and the field of view of the first camera 110 may be outwards towards a top area above the computing device 100.

As depicted in FIG. 1A, in some implementations, the computing device 100 may have a substantially flat front surface in which a display screen 140 and one or more cameras (e.g., a first camera 110 and/or a second camera 120) may be positioned. In some implementations, the front surface of the computing device 100 may also include one ore more audio outputs 150. In further implementations, the audio output 150 may be positioned on another surface of the computing device 100, such as a back surface and/or side surface.

The display screen 140 may be positioned on the front surface of the computing device 100 to allow for the display screen 140 to be easily viewed by a user. In some implementations, the display screen 140 may be viewable by a user in different orientations, such as a first orientation 101 where the display screen 140 is substantially vertical or a second orientation 103 where the display screen 140 is substantially horizontal. The display screen 140 may be adapted to orient the content of the display screen 140 relative to the orientation of the computing device 100 in order to allow content to be presented to the user as being upright, based on the orientation of the computing device 100. For example, when the computing device 100 is rotated from the first orientation 101 to the second orientation 103, the top of the display screen 140 in the first orientation 101 becomes the bottom of the display screen 140 in the second orientation 103. The activity application(s) 414 may receive the orientation information from the orientation sensor 522 and the activity application(s) 414 may cause the content of the display screen 140 to be rotated 180 degrees in order to account for the change in orientation as described in more detail elsewhere herein.

In some implementations, the displays screen 140 may occupy a portion of the front surface of the computing device 100. The peripheral surfaces (such as the first peripheral surface 102 and the second peripheral surface 104) may occupy other portions of the front surface of the computing device 100 along the periphery of the side of the display screen 140 (such as the first side 142 and/or the second side 144). These other peripheral surfaces may allow for other components of the computing device 100 to be positioned. For example, as depicted in FIG. 1A, the first camera 110 may be located on the first peripheral surface 102 proximate to the first side 142 of the display screen 140. In FIG. 1A, the computing device 100 is positioned in the first orientation 101 and the first camera 110 may be identified as the top camera along the top peripheral surface of the computing device 100. As depicted in FIG. 1A, the second camera 120 may be located on the second peripheral surface 104 proximate to the second side 144 of the display screen 140. In the first orientation 101, the second camera 120 may be identified as the bottom camera along the bottom peripheral surface of the computing device 100.

As depicted in FIG. 1A, the first camera 110, the second camera 120, and the display screen 140 are all located on the front surface of the computing device 100. It should be understood that while the first camera 110, second camera 120, and the display screen 140 are integrated into the front surface of the computing device 100 as shown, in other implementations, one or more of the first camera 110, the second camera 120, and/or the display screen 140 may be separate components that may be attachable to the front surface of the computing device 140 and may be positionable around the peripheral surfaces of the computing device 100.

As depicted in FIG. 1A, the first camera 110 is positioned opposite the second camera 120 on the front surface of the computing device 100. As depicted in FIG. 1A, the first camera 110 is centered along the first peripheral surface 102 and the second camera 120 is centered along the second peripheral surface 104. In further implementations, additional cameras (not shown) may be positioned on other portions of the front surface of the computing device 100 and these additional cameras may be configured to capture additional fields of view separate from the fields of view of the first camera 110 and/or the second camera 120. In some implementations, the different fields of view may overlap and allow for stereo vision from the additional cameras, as describe elsewhere herein. In some implementations, the activity application(s) 414 may select which cameras (from the first camera 110, second camera 120, and/or additional cameras) to use to capture a video stream and may limit the amount of cameras use to capture video streams to improve processing time. In further implementations, based on the orientation of the computing device 100, the activity application(s) 414 may select specific cameras (from the first camera 110, second camera 120, and/or additional cameras) based on the orientation of the computing device 100.

In some implementations, the first camera 110 and the second camera 120 may be positioned on the same peripheral surface (such as the first peripheral surface 102 or the second peripheral surface 104) and the first camera 110 and the second camera 120 may be positioned to capture different fields of view despite being positioned on the same peripheral surface. For example, the first camera 110 and the second camera 120 may both be positioned on the first peripheral surface 102 (such as adjacent to each other, or within a distance of a couple of inches but positioned on the first peripheral surface 102, etc.). In the example, the first camera 110 may have a first field of view (such as forward looking to capture things in front of the computing device, such as a user, etc.) and the second camera 120 may have a second field of view (such as downward looking to capture things on a surface the computing device 100 is resting on, such as tangible objects, etc.).

FIGS. 1B and 1C illustrate perspective views of the computing device 100 from a front perspective and a rear perspective, respectively. As depicted in FIGS. 1B and 1C, the computing device 100 may include a supporting element 130 for supporting and positioning the computing device 100 on a physical surface in different orientations. In some embodiments, the supporting element 130 may rest against the physical surface on different surfaces, such as a bottom surface 133 of the supporting element 130 or a back surface 135 of the supporting element 130 in order to prop the computing device 100 up in the different orientations, such as the first orientation 101 shown in FIGS. 1B and 1C.

In some implementations, the supporting element 130 may extend out from a back surface 150 of the computing device 100. In these implementations, the back surface 150 of the computing device 100 may be substantially flat, and the supporting element 130 may extend out from a portion of the back surface 150 of the computing device 100. As shown in FIG. 1C, the supporting element 130 may extend out of a lower portion 152 of the back surface 150 of the computing device 100. In some implementations, the supporting element 130 may be extend along at least a portion of the lower portion 152 of the back surface 150 of the computing device 100. In further implementations, the supporting element 130 may be a rod or protrusion that may be capable of supporting the computing device 100 while being minimal in size. In some implementations, the supporting element 130 may be detachable and may be removed from the back surface 150 of the computing device 100 in order to allow the computing device 100 to lay flat on a surface. In further implementations, the supporting element 130 may be foldable and may be able to fold flat against the back surface 150 of the computing device 100 in order to allow the computing device 100 to lay flat on a surface.

In some implementations, the supporting element 150 may include components of the computing device 100. For example, a battery and or other components of the computing device 100 may be positioned within the larger area of the supporting element 150 compared to the thinner area of the computing device 100 that includes the display screen 140. In some implementations, the supporting element may include one or more access ports 132, such as a power button 132a, a memory card slot 132b, an input/output port 132c (such as a 3.5 mm port, etc.), etc. By positioning the access ports 132 on the supporting element 130, a user can interact with the various ports 132 without obscuring the field of views of the first camera 110 and/or second camera 120, and/or the view of the display screen 140.

In some implementations, an additional supporting element 170 may be present on one or more surfaces of the computing device, such as the back surface 150 of the computing device 100. The additional supporting element 170 may be a protrusion on the back surface 150 of the computing device 100 or a piece of plastic/rubber/metal/etc. that is positioned on the back surface 150. The additional supporting element 170 may be positioned on the back surface 150 of the computing device 100, such that when the computing device 100 is placed in differ orientations, such as the second orientation 103, the additional supporting element 170 comes into contact with a surface and assists in positioning and retaining the computing device 100 in the second orientation 103, as shown in FIG. 2B.

In some implementations, the computing device 100 may include additional hardware input/outputs, such as a volume control 180 and/or a screen lock button 182. These additional hardware input/outputs may be positioned on a side surface of the computing device 100, as shown in FIGS. 1B and 1C where the additional hardware input/outputs may be easily accessible by a user without obscuring the display screen 140 and/or field of views of the cameras. In some implementations, these additional hardware input/outputs may be configurable to provide similar functions independent of the orientation of the computing device 100 as described elsewhere herein with respect to FIGS. 8A and 8B.

In some implementations, a camera protrusion 160 may be included on the computing device 100. The camera protrusion 160 may be a molded portion of one of the peripheral surfaces (such as the first peripheral surface 102 or the second peripheral surface 104). The camera protrusion 160 may extend out from the peripheral surface and have a camera (such as the first camera 110 and/or the second camera 120) positioned within the protrusion in order to increase what is included in the field of view of the camera as compared to a camera mounted flat on the peripheral surface of the computing device 100. For example, the camera protrusion 160 may angle the camera to look down towards a surface in front of the display screen 140 and the computing device 100, whereas a camera mounted flat on the peripheral surface would look out towards the area in front of the computing device 100 rather than down towards the surface the computing device 100 is resting on. In some implementations, the camera protrusion 160 may direct the field of view of the camera to include at least a portion of the computing device 100 and/or the display screen 140 and the information captured related to the display screen 140 and or the computing device 100 may be used by the activity application(s) 414 to change one or more routines being executed by the activity application(s) 414.

Figure 2B:
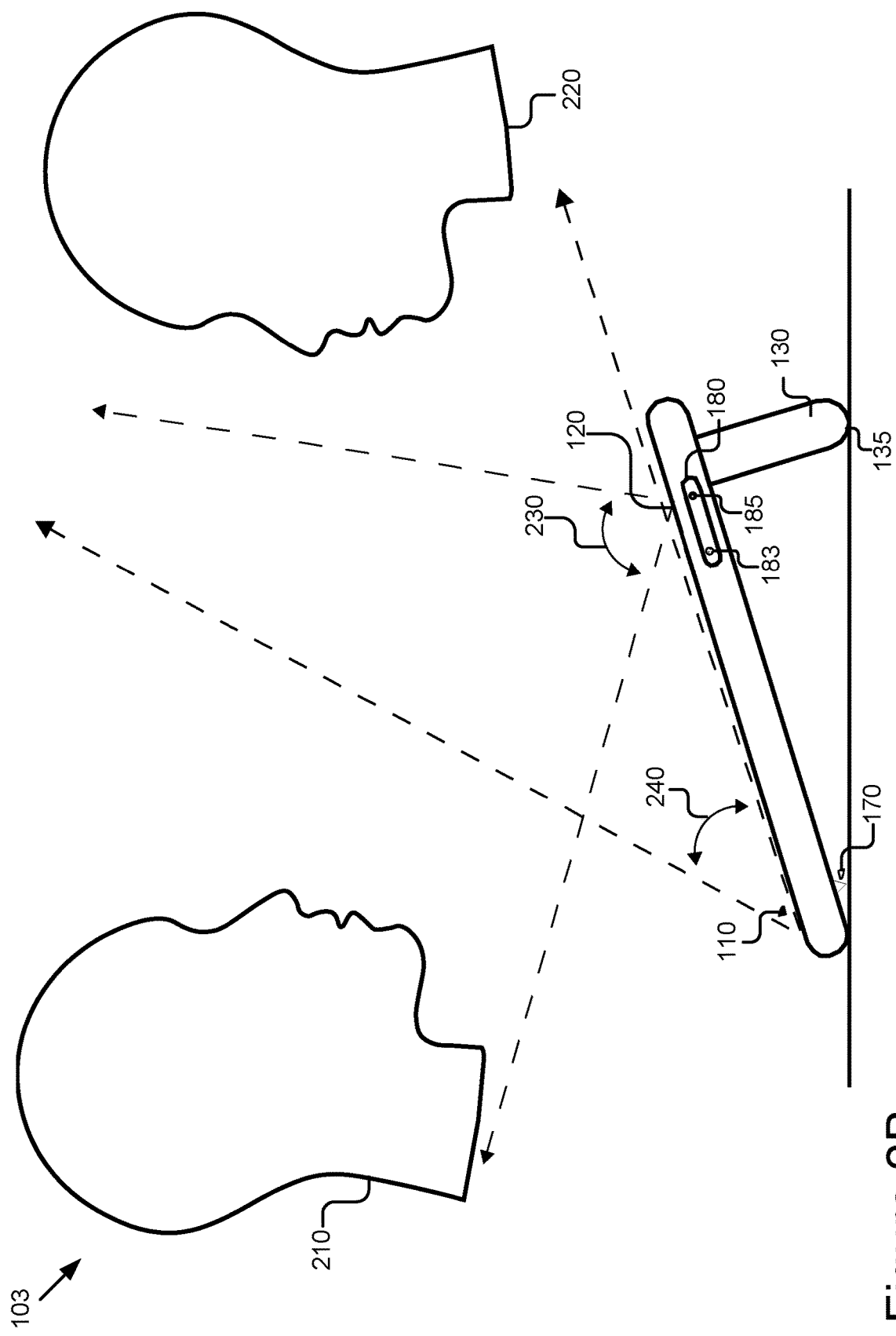
FIG. 2B illustrates a side view of a computing device in a second orientation and depicts fields of view of a first camera and a second camera.

FIG. 2A illustrates the computing device 100 situated in the first orientation 101. As shown, in the first orientation 101, the computing device 100 is resting on a bottom side edge 190 of the computing device 100 and the bottom surface 133 of the supporting element 130. In this position, the front of the computing device 100 and the display screen 140 are positioned in a substantially vertical position. In some implementations, the display screen 140 may be leaning slightly back in an angled vertical position, such that if a user sits in front of the computing device 100 while the computing device 100 is resting on a surface 112 in the angled vertical position, the user is looking forward and slightly down to view the display screen 140.

As shown in FIG. 2A showing a side view of the computing device 100, the first camera 110 may include a first field of view 230 and the second camera 120 may include a second field of view 240. As shown in this example, the first field of view 230 is angled downwards and includes the area immediately in front of the display screen 140 and the portion of thee surface 122 proximate to the front of the computing device 100. As shown in this example, the second field of view 240 is angled outward and/or upward to capture the area in front of the computing device 100, such as a user viewing the computing device 100 from approximately 2 feet away, etc. It should be understood that the field of view 230 and the field of view 240 are depicted as triangles with limited bounds, but that any shape of field of view can be depicted and the view is not limited to the shapes shown. Additionally, the field of view 230 and the field of view 240 may extend beyond the shapes shown and the distance of what can be captured is limited only by the constraints of what the camera can view. For example, special lenses, such as a fish-eye or telescopic lens may be used to adapt the field of view of the camera to capture specific portions of an area.

As shown in the example in FIG. 2A, the field of view 230 and the field of view 240 may overlap where both the first camera 110 and the second camera 120 may capture an object within the overlap but from a different perspective. This may allow the activity application(s) 414 to perform stereo vision, where an object, such as a user or physical object, may be captured in the two different video streams and the locations of the separate cameras (first camera 110 and second camera 120) may be down relative to the object being captured in the images. This may allow the activity application(s) 414 to track an acceleration, depth, or other information related to the object using the two different views. This may allow the activity application(s) 414 to capture three-dimensional information suing the two different two dimension captured video streams. It may allow the activity applications(s) 414 to estimate the distance of the object, a range of the object, a depth, an acceleration of the object, etc. The activity application(s) 414 may perform stereopsis on the captured video streams to provide a three-dimensional visualization based on the captured video streams. In further implementations, the activity application(s) 414 may account for when an object in one of the fields of view (such as field of view 230 and/or field of view 240) is obscured (such as by a hand moving the object, or another object being placed in front of the object) and the activity application(s) 414 may use the other field of view to continue to track the object that is obscured. It should be understood that by adding additional cameras along with the first camera 110 and the second camera 120, the stereo vision capabilities may be enhanced by the capturing of additional video streams showing additional fields of view.

FIG. 2B illustrates the computing device 100 situated in the second orientation 103. As shown in FIG. 2B, in the second orientation 103, the computing device 100 may be positioned so that supporting element 130 is angling the computing device 100 is an angled flat position and the back surface of the supporting element 130 is resting against the surface and the additional supporting element 170 is resting against the surface. The substantially flat position of the computing device 100 may be such that when a user is viewing the display screen in this position, the bottom edge of the display screen 140 is lower than the top edge of the displays screen 140 relative to the user and the surface on which the computing device 100 is resting. For example, in this position, a user 210 may be viewing the computing device 100 in on lap and the surface of their lap is where the computing device 100 is resting. The back surface of the computing device 100 with the supporting element 130 is higher than the back of surface of the computing device 100 with the additional supporting element 170, to tilt the screen slightly towards user 210. In some implementations, the computing device 100 may be oriented into the second orientation 103 by rotating the computing device 100 180 degrees around itself relative to the first orientation 101 and then resting the computing device 100 on the surface in the second orientation 103. In further implementations, the supporting element 130 may be slidable or detachably removable and may be raised from the first portion of the back surface of the computing device 100 to a second portion of the back surface of the computing device 100 without rotating the computing device, to position the computing device in the second orientation 103.

As shown in FIG. 2B, in the second orientation 103, the first camera 110 may be identified as a bottom camera as it is located at the bottom of the display screen 140 and the second camera 120 may be identified as a top camera as it is located at the top of the display screen 140 in the second orientation 103. The field of view 240 of the first camera 110 may be directed upward and out along the top edge of the computing device 100 in the second orientation 103. The field of view 230 of the second camera 120 may be directed up towards the top area above the display screen 140 of the computing device 100. As shown in the example in FIG. 2B, the field of view 230 may extent up and outward to capture a view of a user 210 viewing the display screen 140 from the bottom of the computing device 100 in the second orientation 103. The field of view 230 may capture at least a portion of a face of the user 210 from an angle below the face of the user 210. The second camera 120 may be able to include the face of the user 210 in the captured video streams and may provide the face of the user 210 to the activity application(s) 214 for facial analysis to detect facial expressions, such as confusion, disinterest, sleepiness, etc.

In some implementations, the second camera 120 may also be directed upwards above the computing device 100 and may be able to capture a field of view that includes objects such as a ceiling, a lighting array, etc. Using this field of view 230, the video stream of the second camera 120 may be analyzed to identify specific rooms or locations that the computing device 100 is located in. For example, the activity application(s) 414 may have a database of room profiles, such as a user's classroom, home, etc. and the activity application(s) 414 may compare the field of view 230 to the database of room profiles and determine which ceiling matches with what is being captured in the video stream of the second camera 120. This may allow the activity application(s) 414 to run specific applications in specific locations. For example, the activity application(s) 414 may block the request to run a game when the activity application(s) 414 determines that the computing device 100 is located in the user's classroom at the moment.

In some implementations, the second camera 120 may be configured to capture a field of view 230 that includes the first user 210 and the first camera 110 may be configured to capture a field of view 240 of a second user 220. The first user 210 and the second user 220 may be positioned on opposite sides of the computing device 100 and they may both be able to view the display screen 140 from their respective positions. The activity application(s) 414 may run an application that both users can participate in and the activity application(s) 414 may analyze objects, expressions, gestures, etc. that are presented by the first user 210 and the second user 220 in the respective fields of view. In another example, the first user 210 may be a student and the second user 220 may be a teacher. The activity application(s) 414 may capture the interactions between the teacher and the student, including the facial expressions and/or gestures of the teacher or student and execute an application based on the captured information.

Figure 3:
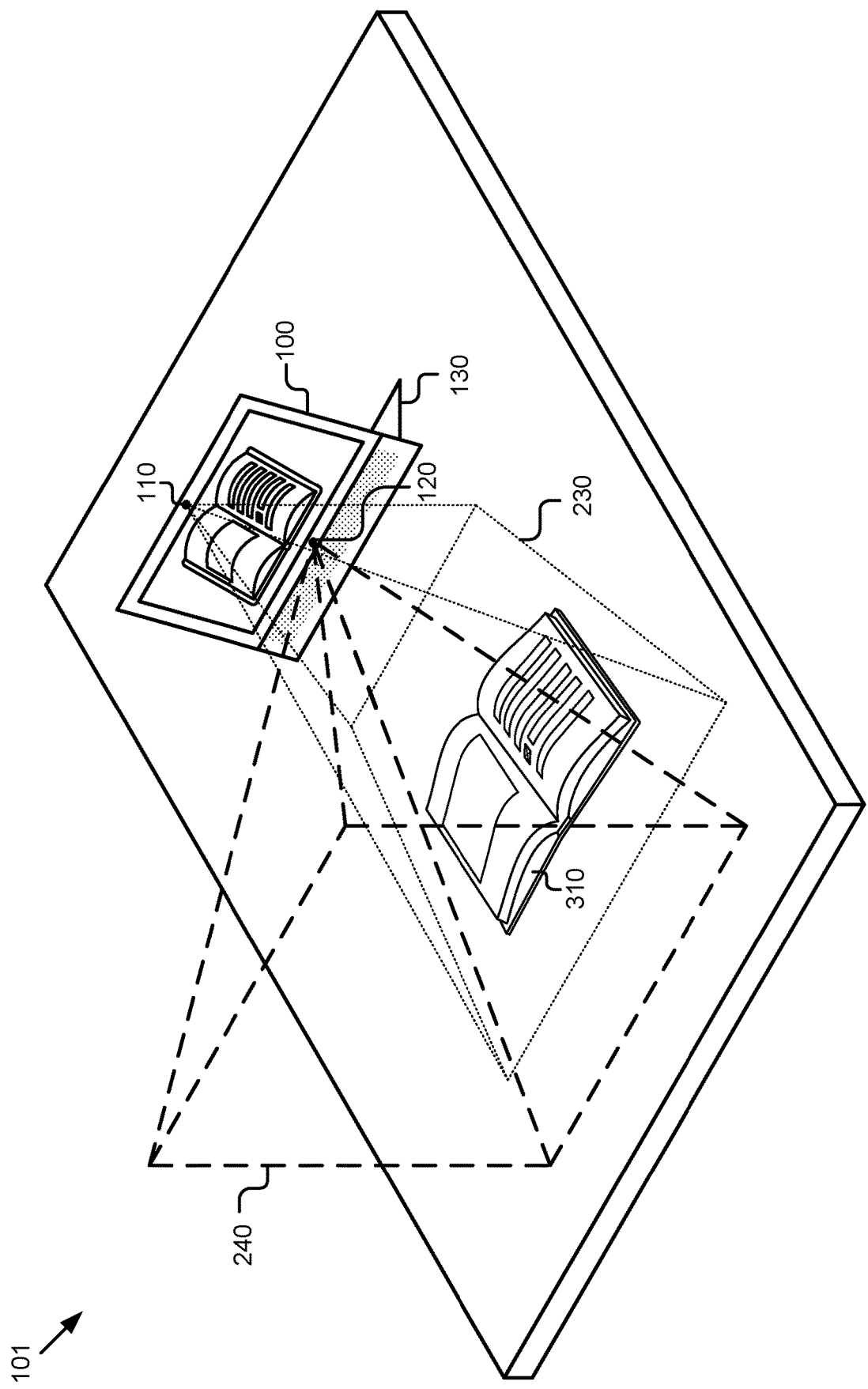
FIG. 3 illustrates a field of view of a first camera and a field of view of a second camera of an example computing device when the example computing device is situated in a first orientation on an activity surface.

FIG. 3 illustrates an example computing device 100 in the first orientation 101. As shown in this example, the first camera 110 includes a field of view 230 that extends downward towards the surface on which an activity object 310 (e.g., a book, etc.) is present. The second camera 120 includes a field of view 240 that extends outward towards the area in front of the computing device as shown. The computing device 100 may capture a video stream of the activity object 310 using the first camera 110 and a video stream of a user (not shown) interacting with the activity object 310 using the second camera 120. The activity application(s) 414 may generate a visualization of the activity object 310 for display on the display screen 140 and the user (not shown) may be able to simultaneously interact with the activity object 310 and the visualization on the display screen 140, while the second camera captures at least a portion of the user, such as a face or hands, as the user interacts. This allows for the user to experience an enriched interaction with both physical and virtual objects while the activity application(s) 414 may capture an image of the user for additional routines. For example, the user may be doing homework and learning about a topic in a textbook. The activity application(s) 414 may identify the topic from the textbook and provide additional curated information related to the topic on the display screen 140. The activity application(s) 414 may also capture one or more facial expressions of the user and based on the captured facial expressions, may remove or supplement the virtual information presented on the display screen 140. For example, if the user appears confused when viewing the virtual information, the activity application(s) 414 may present a broader overview of the virtual information in order to guide the user as to what the virtual information is presenting.

Figure 4:
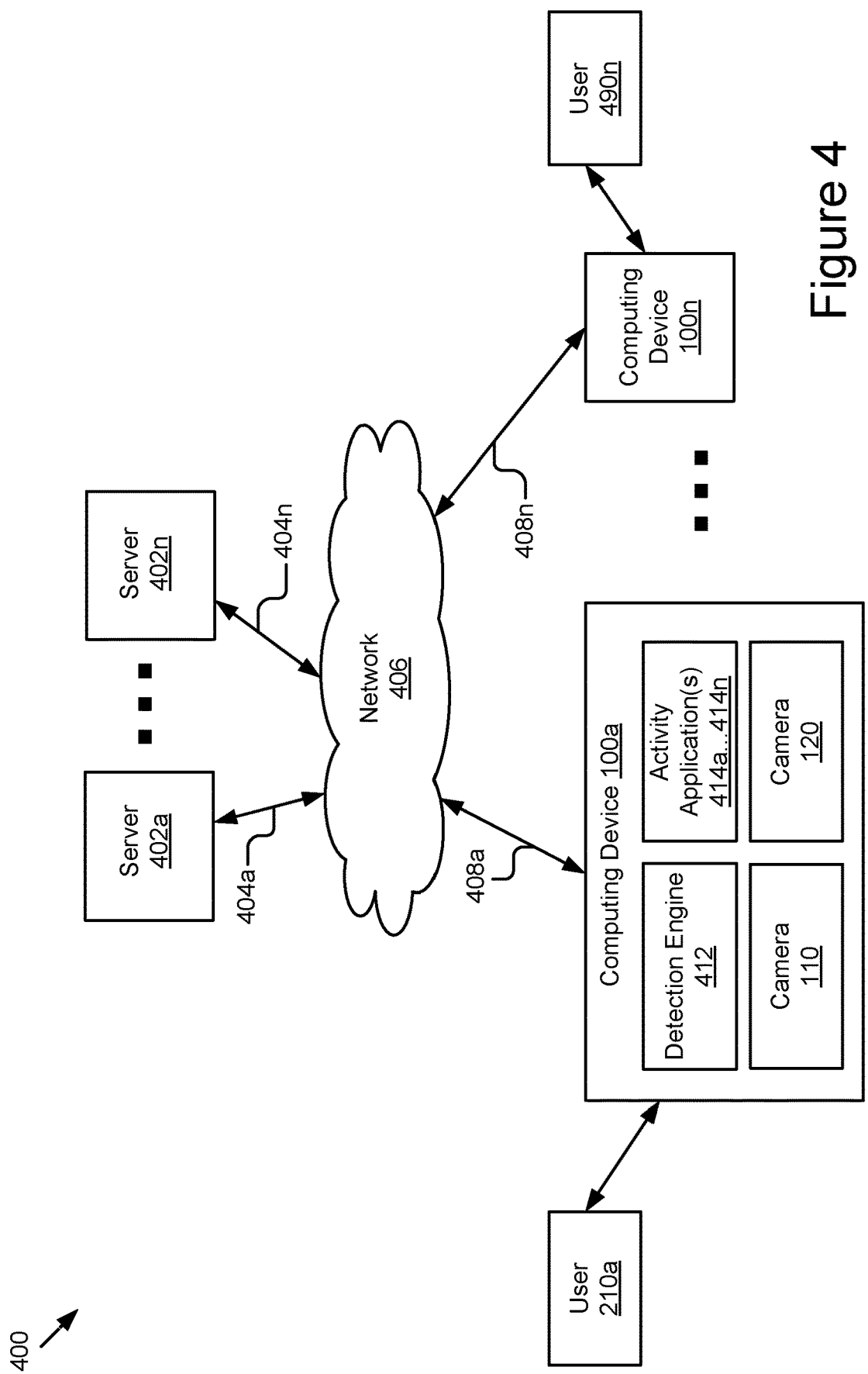
FIG. 4 is a block diagram illustrating an example computer system that includes one or more example computing devices.

FIG. 4 is a block diagram illustrating an example computer system 400 that is used with the computing device 100. As depicted, the system 400 may include computing devices 100a . . . 100n and servers 402a . . . 402n communicatively coupled via a network 406. In FIG. 4 and the remaining figures, a letter after a reference number, e.g., "100a", represents a reference to the element having that particular reference number. A reference number in the text without a following letter, e.g., "100", represents a general reference to instances of the element bearing that reference number. It should be understood that the system 400 depicted in FIG. 4 is provided by way of example and that the system 400 and/or further systems contemplated by this present disclosure may include additional and/or fewer components, may combine components and/or divide one or more of the components into additional components, etc. For example, the system 400 may include any number of servers 402, computing devices 100, and/or networks 406. As depicted in FIG. 4, the computing device 100 may be coupled to the network 406 via the signal line 408 and the server 402 may be coupled to the network 406 via the signal line 404. The computing device 100 may be accessed by user 210.

The network 406 may include any number of networks and/or network types. For example, the network 406 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The computing device 100 may be a computing device that has data processing and communication capabilities. In some embodiments, the computing device 100 may include a processor (e.g., virtual, physical, etc.), a memory, a power source, a network interface, and/or other software and/or hardware components, such as front and/or rear facing cameras, display screen, graphics processor, wireless transceivers, keyboard, firmware, operating systems, drivers, various physical connection interfaces (e.g., USB, HDMI, etc.). In some embodiments, the computing devices 100 may be coupled to and communicate with one another and with other entities of the system 400 via the network 406 using a wireless and/or wired connection. As discussed elsewhere herein, the system 400 may include any number of computing devices 100 and the computing devices 100 may be the same or different types of devices (e.g., tablets, mobile phones, desktop computers, laptop computers, etc.).

As depicted in FIG. 4, the computing device 100 may include the cameras 110 and 120, a detection engine 412, and one or more activity applications 414. The computing device 100 and/or the cameras 110 and 120. In some embodiments, the detection engine 412 may detect and/or recognize objects in a video stream, and cooperate with the activity application(s) 414 to provide the user 210 with a virtual experience that incorporates in substantially real-time the objects and the user manipulation of the objects in the physical environment. As an example, the detection engine 412 may process the video stream captured by the cameras 110 or 120 to detect and recognize an object created by the user. The activity application 414 may generate a visualization of the object created by the user, and display to the user a virtual scene on the display screen 140. The components and operations of the detection engine 412 and the activity application 414 are described in details throughout.

The server 402 may include one or more computing devices that have data processing, storing, and communication capabilities. In some embodiments, the server 402 may include one or more hardware servers, server arrays, storage devices and/or storage systems, etc. In some embodiments, the server 402 may be a centralized, distributed and/or a cloud-based server. In some embodiments, the server 402 may include one or more virtual servers that operate in a host server environment and access the physical hardware of the host server (e.g., processor, memory, storage, network interfaces, etc.) via an abstraction layer (e.g., a virtual machine manager).

The server 402 may include software applications operable by one or more processors of the server 402 to provide various computing functionalities, services, and/or resources, and to send and receive data to and from the computing devices 160. For example, the software applications may provide the functionalities of internet searching, social networking, web-based email, blogging, micro-blogging, photo management, video/music/multimedia hosting/sharing/distribution, business services, news and media distribution, user account management, or any combination thereof. It should be understood that the server 202 may also provide other network-accessible services.

In some embodiments, the server 402 may include a search engine capable of retrieving results that match one or more search criteria from a data store. As an example, the search criteria may include an image and the search engine may compare the image to product images in its data store (not shown) to identify a product that matches the image. In another example, the detection engine 412 and/or the storage 510 (e.g., see FIG. 5) may request the search engine to provide information that matches a physical drawing, an image, and/or a tangible object extracted from a video stream.

It should be understood that the system 400 illustrated in FIG. 4 is provided by way of example, and that a variety of different system environments and configurations are contemplated and are within the scope of the present disclosure. For example, various functionalities may be moved from a server to a client, or vice versa and some implementations may include additional or fewer computing devices, services, and/or networks, and may implement various client or server-side functionalities. In addition, various entities of the system 400 may be integrated into a single computing device or system or divided into additional computing devices or systems, etc.

Figure 5:
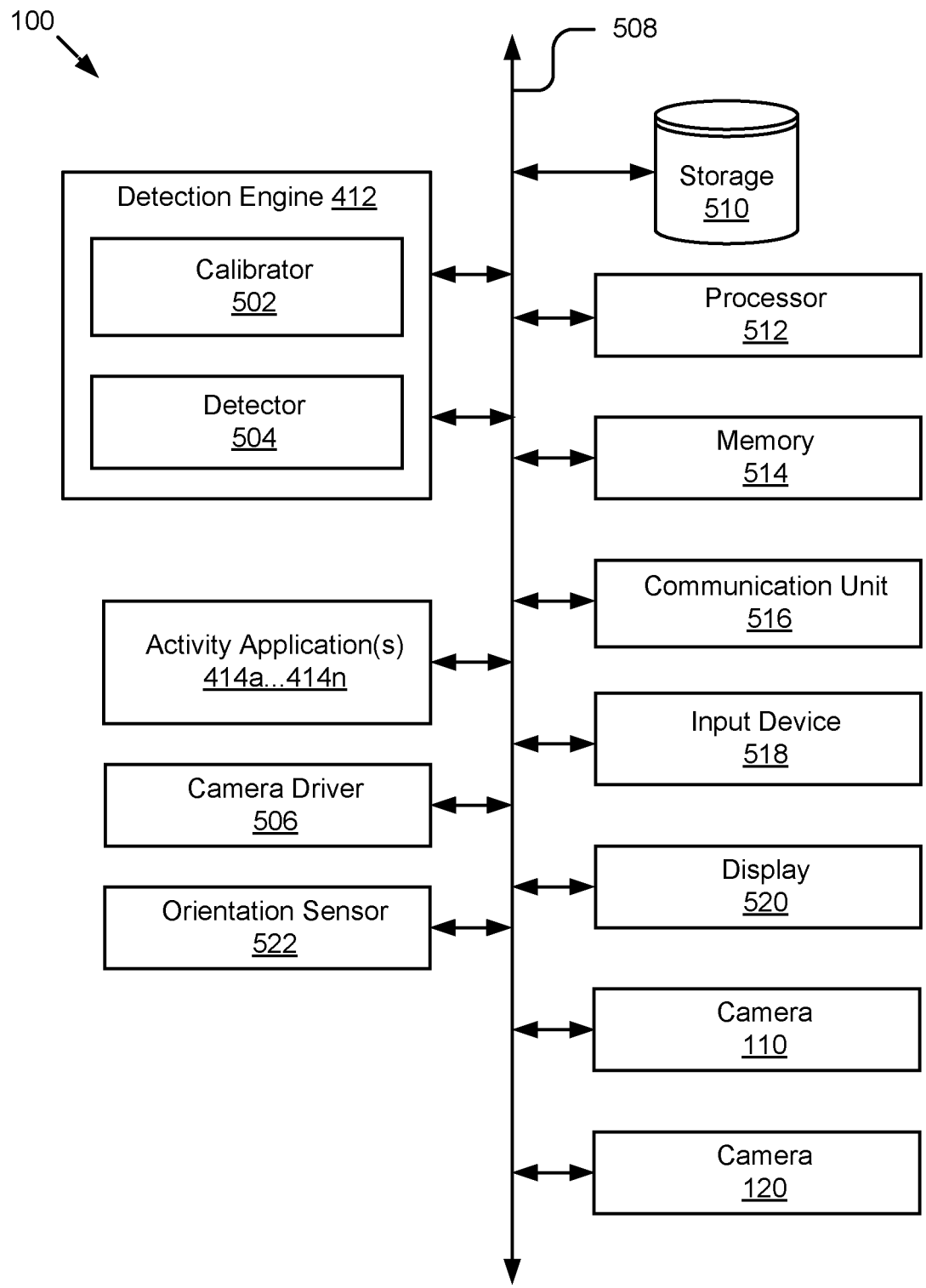
FIG. 5 is a block diagram of an example computing device.

FIG. 5 is a block diagram of an example computing device 100. As depicted, the computing device 100 may include a processor 512, a memory 514, a communication unit 516, an input device 518, a display 520, a storage 510, the camera 110, the camera 120, and the orientation sensor 522 communicatively coupled by a bus 308. It should be understood that the computing device 100 is not limited to such and other components are also possible and contemplated.

The processor 512 may execute software instructions by performing various input/output, logical, and/or mathematical operations. The processor 512 may have various computing architectures to process data signals including, for example, a complex instruction set computer (CISC) architecture, a reduced instruction set computer (RISC) architecture, and/or an architecture implementing a combination of instruction sets. The processor 512 may be physical and/or virtual, and may include a single core or plurality of processing units and/or cores.

The memory 514 may be a non-transitory computer-readable medium that is configured to store and provide access to data to other components of the computing device 100. In some embodiments, the memory 514 may store instructions and/or data that are executable by the processor 512. For example, the memory 514 may store the detection engine 412, the activity applications 414, and a camera driver 506. The memory 514 may also store other instructions and data, including, for example, an operating system, hardware drivers, other software applications, data, etc. The memory 514 may be coupled to the bus 508 for communication with the processor 512 and other components of the computing device 100.

The communication unit 516 may include one or more interface devices (I/F) for wired and/or wireless connectivity with the network 406 and/or other devices. In some embodiments, the communication unit 516 may include transceivers for sending and receiving wireless signals. For example, the communication unit 516 may include radio transceivers for communication with the network 406 and for communication with nearby devices using close-proximity connectivity (e.g., Bluetooth®, NFC, etc.). In some embodiments, the communication unit 516 may include ports for wired connectivity with other devices. For example, the communication unit 516 may include a CAT-5 interface, Thunderbolt™ interface, FireWire™ interface, USB interface, etc.

The display 520 (also referred to as display screen 140) may display electronic images and data output by the computing device 100 for presentation to the user. The display 520 may include any display device, monitor or screen, including, for example, an organic light-emitting diode (OLED) display, a liquid crystal display (LCD), etc. In some embodiments, the display 520 may be a touch-screen display capable of receiving input from one or more fingers of the user. For example, the display 520 may be a capacitive touch-screen display capable of detecting and interpreting multiple points of contact with the display surface. In some embodiments, the computing device 100 may include a graphic adapter (not shown) for rendering and outputting the images and data for presentation on display 520. The graphic adapter may be a separate processing device including a separate processor and memory (not shown) or may be integrated with the processor 512 and memory 514.

The input device 518 may include any device for inputting information into the computing device 100. In some embodiments, the input device 518 may include one or more peripheral devices. For example, the input device 518 may include a keyboard (e.g., a QWERTY keyboard), a pointing device (e.g., a mouse or touchpad), a microphone, a camera, etc. In some implementations, the input device 518 may include a touch-screen display capable of receiving input from one or more fingers of the user. In some embodiments, the functionality of the input device 518 and the display 520 may be integrated, and the user may interact with the computing device 100 by touching a surface of the display 520. For example, the user may interact with an emulated keyboard (e.g., soft keyboard or virtual keyboard) displayed on the touch-screen display 520 by contacting the display 520 in the keyboard regions using his or her fingers.

The orientation sensor 522 may include one or more sensors for detecting an orientation of the computing device 100. In some implementations, the orientation sensor 522 may include on more orientation sensors 522 that can detect the orientation of the computing device 100. The orientation sensors may be configured to detect an angle or tilt of the computing device, such as by using an accelerometer or similar sensor relative to a known position and communication the angle or tilt to the activity application(s) 414. For example, the orientation sensor 522 can detect the differences in the tilt of the computing device 100 in order to determine when the computing device 100 is positioned in the first orientation 101 or the second orientation 103 and may provide that information to the activity application(s) 414.

The detection engine 412 may include a calibrator 502 and a detector 504. The components 412, 502, and 504 may be communicatively coupled to one another and/or to other components 414, 506, 510, 512, 514, 516, 518, 520, 110, 120, and/or 522 of the computing device 100 by the bus 508 and/or the processor 512. In some embodiments, the components 412, 502, and 504 may be sets of instructions executable by the processor 512 to provide their functionality. In some embodiments, the components 412, 502, and 504 may be stored in the memory 514 of the computing device 100 and may be accessible and executable by the processor 512 to provide their functionality. In any of the foregoing implementations, these components 412, 502, and 504 may be adapted for cooperation and communication with the processor 512 and other components of the computing device 100.

The calibrator 502 includes software and/or logic for performing image calibration on the video stream captured by the cameras 110 and/or 120. In some embodiments, to perform the image calibration, the calibrator 502 may calibrate the images in the video stream to adapt to the capture position of the cameras 110 and/or 120. The capture position of the cameras 110 and/or 120 may depend on the computing device 100 attributes and/or the orientation of the computing device 100. Capturing the video stream from a camera position in different orientations may cause distortion effects on the video stream. Therefore, the calibrator 502 may adjust one or more operation parameters of the cameras 110 and 120 to compensate for these distortion effects. Examples of the operation parameters being adjusted include, but are not limited to, focus, exposure, white balance, aperture, f-stop, image compression, ISO, depth of field, noise reduction, focal length, etc. Performing image calibration on the captured video streams is advantageous, because it can optimize the images of the video streams to accurately detect the objects depicted therein, and thus the operations of the activity applications 414 based on the objects detected in the video streams can be significantly improved.

In some embodiments, the calibrator 502 may also calibrate the images to compensate for the characteristics of the activity surface (e.g., size, angle, topography, etc.). For example, the calibrator 502 may perform the image calibration to account for the discontinuities and/or the non-uniformities of the activity surface, thereby enabling accurate detection of objects when the computing device 100 is set up on various activity surfaces (e.g., bumpy surface, beds, tables, whiteboards, etc.). In some embodiments, the calibrator 502 may calibrate the images to compensate for optical effect caused by the optical elements of the cameras 110 and/or 120. In some embodiments, the calibrator 502 may also calibrate the cameras 110 or 120 to split their field of view into multiple portions with the user being included in one portion of the field of view and the activity surface being included in another portion of the field of view of the cameras 110 and/or 120.

The detector 504 includes software and/or logic for processing the video stream captured by the cameras 110 or 120 to detect the objects present in the video stream. In some embodiments, to detect an object in the video streams, the detector 504 may analyze the images of the video streams to determine line segments, and determine the object that has the contour matching the line segments using the object data in the storage 510. In some embodiments, the detector 504 may provide the tangible objects detected in the video stream to the activity applications 414. In some embodiments, the detector 504 may store the objects detected in the video stream in the storage 510 for retrieval by these components. In some embodiments, the detector 504 may determine whether the line segments and/or the object associated with the line segments can be identified in the video stream, and instruct the calibrator 502 to calibrate the images of the video stream accordingly.

The activity application 414 includes software and/or logic executable on the computing device 100. In some embodiments, the activity application 414 may receive the objects detected in the video stream of the activity surface from the detector 504. In some embodiments, the activity application 414 may generate a virtual environment that incorporates, in real-time, the virtualization of the tangible objects and the user manipulation of the tangible objects on the activity surface, and display the virtual environment to the user on the computing device 100. Non-limiting examples of the activity application 414 include video games, learning applications, assistive applications, storyboard applications, collaborative applications, productivity applications, etc. Other types of activity application are also possible and contemplated.

The camera driver 506 includes software storable in the memory 514 and operable by the processor 512 to control/operate the cameras 110 and 120. For example, the camera driver 506 may be a software driver executable by the processor 512 for instructing the cameras 110 and 120 to capture and provide a video stream and/or a still image, etc. In some embodiments, the camera driver 506 may be capable of controlling various features of the cameras 110 and 120 (e.g., flash, aperture, exposure, focal length, etc.). In some embodiments, the camera driver 506 may be communicatively coupled to the cameras 110 and 120 and other components of the computing device 100 via the bus 508, and these components may interface with the camera driver 506 to capture video and/or still images using the cameras 110 and 120.

As discussed elsewhere herein, the cameras 110 and 120 are video capture devices (e.g., a camera) adapted to capture video streams and/or images in their field of view. In some embodiments, the cameras 110 and 120 may be coupled to the bus 508 for communication and interaction with the other components of the computing device 100. In some embodiments, the one or more of the cameras 110 and 120 may include a lens for gathering and focusing light, a photo sensor including pixel regions for capturing the focused light, and a processor for generating image data based on signals provided by the pixel regions. The photo sensor may be any type of photo sensor (e.g., a charge-coupled device (CCD), a complementary metal-oxide-semiconductor (CMOS) sensor, a hybrid CCD/CMOS device, etc.). In some embodiments, the cameras 110 and 120 may include a microphone for capturing sound. Alternatively, the cameras 110 and 120 may be coupled to a microphone that is coupled to the bus 508 or included in another component of the computing device 100. In some embodiments, the cameras 110 and 120 may also include a flash, a zoom lens, and/or other features. In some embodiments, the processor of the cameras 110 and 120 may store video and/or still image data being captured in the memory 514 and/or provide the video and/or still image data to other components of the computing device 100, such as the detection engine 412 and/or the activity applications 414.

The storage 510 is a non-transitory storage medium that stores and provides access to various types of data. Non-limiting examples of the data stored in the storage 510 include video stream and/or still images captured by the cameras 110 and 120, object data describing various tangible objects (e.g., object contour, color, shape and size, etc.), object detection result indicating the tangible objects, etc. In some embodiments, the data stored in the storage 510 may also include one or more orientation profiles. For example, the orientaiton profile may include the position information of the various cameras 110 and 120 as well as expected fields of view in different orientations.

In some embodiments, the storage 510 may be included in the memory 514 or another storage device coupled to the bus 508. In some embodiments, the storage 510 may be included in a distributed data store, such as a cloud-based computing and/or data storage system. In some embodiments, the storage 510 may include a database management system (DBMS). The DBMS may be a structured query language (SQL) DBMS. For example, the storage 510 may store data in an object-based data store or multi-dimensional tables including rows and columns, and may manipulate (i.e., insert, query, update, and/or delete) data entries stored in the storage 510 using programmatic operations (e.g., SQL queries and statements or a similar database manipulation library). Other implementations of the storage 510 with additional characteristics, structures, acts, and functionalities are also possible and contemplated.

Figure 6:
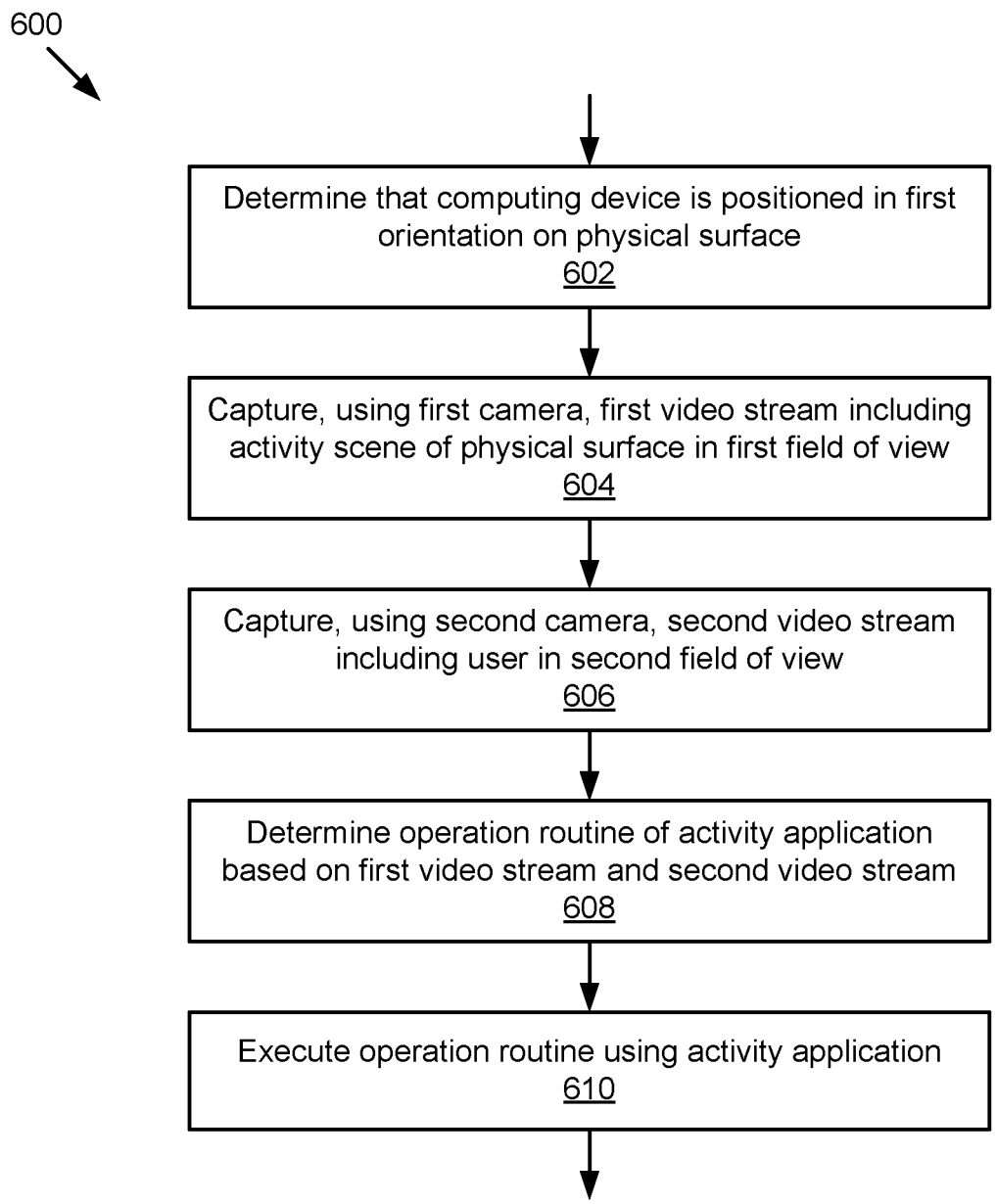
FIG. 6 is a flowchart of an example method for determining an orientation of a computing device.

FIG. 6 depicts an example method for determining what orientation a computing device 100 is positioned in. At block 602, the orientation sensor 522 may determine that the computing device 100 is positioned in a first orientation 101 on a physical surface. The orientation sensor 522 may determine that the computing device 100 is in the first orientation based on an angle detected by one or more orientation sensors 522 that can determine how the computing device 100 is orientated and angled. The computing device 100 may include a first camera 110 configured to capture a first field of view 230 and a second camera 120 configured to capture a second field of view 240 that is different from the first field of view. In some implementations the first field of view 230 and the second field of view 240 may originate from different camera locations on the computing device 100, in further implementations, the first field of view 230 and the second field of view 240 may overlap at least a portion of the field of view. In some implementations, the first field of view 230 of the first camera 110 may be directed towards the physical surface and the second field of view 240 of the second camera 120 may be directed towards a user facing the computing device 100 when the computing device 100 is situated in the first orientation 101.

At block 604, the first camera 110 may capture a first video stream including an activity scene of the physical activity surface in the first field of view 230. The activity scene may be a portion of a surface proximate to the computing device 100. In some implementations, one or more objects or other items may be positioned on the surface within the field of view 230 of the first camera 110. In further implementations, a user may draw or craft an image on a piece of paper or board situated on the surface and within the field of view 230 of the first camera 110. In another implementation, the objects may be passed through the field of view 230 of the first camera 110 without being placed on the surface, such as a gesture performed by the user in the area proximate to the computing device 100 and within the field of view 230 of the first camera 110.

At block 606, the second camera 120 may capture a second video stream including a user in the second field of view 240. The second video stream may include a profile of user positioned in front of the computing device 100 and within the second field of view 240. For example, the user can be positioned in front of the computing device 100 and viewing content on the display screen 140 while the computing device 100 rests on a table and the user sits in a chair.

In some implementations, the video stream may capture at least a portion of a face of a user. In further implementations, the video stream may capture at least a portion of an appendage of the user, such as a hand, to capture a gesture. The video stream may include objects that are being held or manipulated by a user. The video stream may further include the environment around a user, such as posters in a classroom, etc. In some implementations, the video stream may include facial expression information from the user.

At block 608, the activity application(s) 414 may determine an operation routine based on the first video stream and the second video stream. For example, the first video stream may include a textbook for a student and the second video stream may identify which specific student is present in front of the computing device 100. The activity application(s) 414 may retrieve a personalized study schedule from the storage 510 related to the identity of the specific student and find which topic the student has been assigned in the specific book that has been identified from the first video stream. The activity application(s) 414 may then cause the specific topic and page number to be displayed on the display screen 140 for student to open the book to that page without having to receive any directions from the student. This is advantageous as it reduces the busy work and time needed for a student to begin learning assigned material and also reduces the opportunity for mistakes to arise from the student not knowing where to go in the book, etc.

In another example, the activity application(s) 414 may determine a user state of the user in the second video stream. The user state may include a facial feature the user state may be determined based on the facial feature. For example, the facial features may be an expression of confusion, an attention level, an emotional condition, such as happiness, sadness, angry, joy, frustration, etc. In some implementations, the detector 504 may compare identified points on a user's face to a database of facial expressions and map the identified points to the example facial expressions. When a facial expression mapping exceeds a threshold value, then the facial expression is identified based on the example. In some implementations, the example facial expressions may be based on a machine learning algorithm that is continuously updated as the sample size and accuracy increases. In further implementations, the facial expressions may be personalized for a specific user and over time as different facial expressions are captured of that specific user, the detector 504 may update the examples facial expression for that user to increase accuracy.

In some implementations, the operation routine may be a task for the user and the complexity of the task may be updated based on the captured information. For example, if a user exhibits frustration, such as in a facial expression, or a threshold period of time has expired without interacting with an object, the activity application(s) 414 may identify an operation routine with a lower complexity level and/or provide an instruction detail level that is appropriate for what the user is currently doing. For example, if a math problem is presented on the display screen 140 and the user is supposed to work through the problem on the surface which is captured by the first video stream. If the activity application(s) 414 determines that the user appears confused or that they haven't progressed to the next step of the problem on the surface, then the activity application(s) 414 may present an operation routine that provides a hint for what to perform next to solve the math problem.

At block 610, the activity application(s) 414 may execute the operation routine on the display screen 140. The activity application(s) 414 may cause one or more programs to be executed based on the operation routine. In some implementations, the activity application(s) 414 may cause additional information to be displayed on the display screen 140, such as page number or student information. In further implementations, the activity application(s) 414 may generate a visualization based on information detected in the first or second video stream and display the visualization on the display screen 140. For example, the first video stream may include a drawing of a ball and the second video stream may include a facial expression from the user that is happy. The activity application(s) 414 may generate a virtual avatar that is smiling and throwing a virtualization of the drawing of the ball, such as a virtualization with similar shapes, colors, contours, etc.

Figure 7:
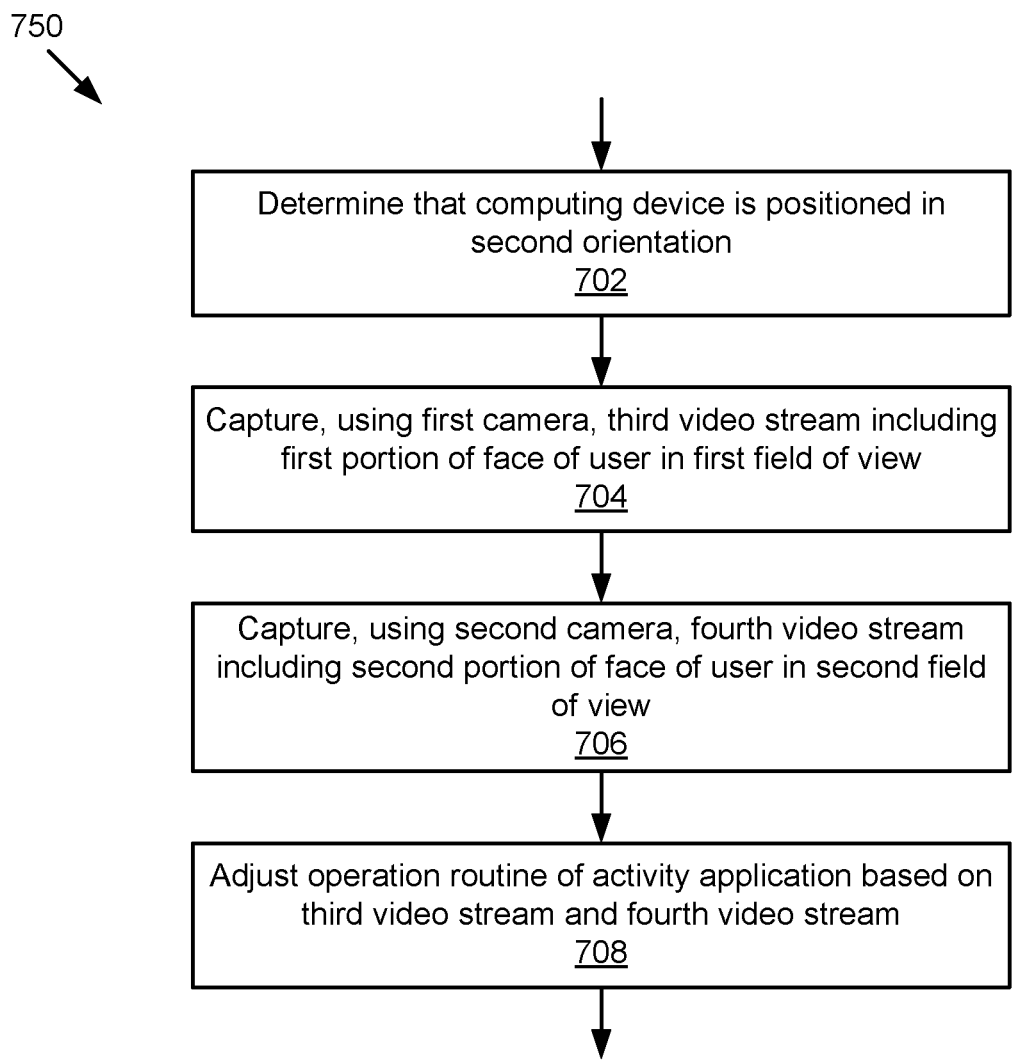
FIG. 7 is a flowchart of an example method for capturing video streams in a second orientation.

FIG. 7 depicts an example method for determining orientation a computing device 100. At block 702, the computing device 100 is positioned in the second orientation and the activity application(s) 414 may determine that the computing device 100 is positioned in the second orientation 103. In some implementations, the computing device 100 may change orientation from the first orientation 101 to the second orientation 103 and the orientation sensor 522 may detect that change in orientation and provide the change in orientation to the second orientation 103 to the activity application(s) 414. In the second orientation 103, the first field of view 240 of the first camera 110 is directed towards the user facing the computing device 100 and the second field of view 230 of the second camera 120 is also directed towards the user facing the computing device 100.

At block 704, the first camera 110 may capture a third video stream including a first portion of a face of the user in the first field of view 240. For example, the first portion of the face of the user may be a view of the user from below the face of the user and include a portion of the mouth and the direction the head of the user is facing. At block 706, the second camera 120 may capture a fourth video stream including a second portion of the face of the user in the second field of view 230. The second portion of the face of the user may be a forward looking view of the user and may include the use and mouth expressions. In this way, the third video stream may show where the user is looking and how the head is tilted and the fourth video stream may include forward looking facial expressions simultaneously capture with the third video stream. By capturing two different video streams that have a high level of detail focusing on specific portions of a user's face, the activity application(s) 414 may be able to more accurately predict a user state and will receive more detailed facial expression information compared to a single camera that can't provide the same level of detail as the two cameras capturing video streams simultaneously.

At 708, the activity application(s) 414 may adjust an operation routine being displayed on the display screen 140 based on the information detected in the third video stream and the fourth video stream. For example, the fourth video stream may capture the way the mouth of the user pronounces a word displayed on the display screen and the additional detail provided by the third video stream may provide additional detail of how the mouth is shaping the word. For example, using stereo vision, a three-dimensional depiction of the mouth forming the words may be presented on the display screen 140 and a user may be able to see how they are supposed to shape a word using their mouth.

Figure 8A:
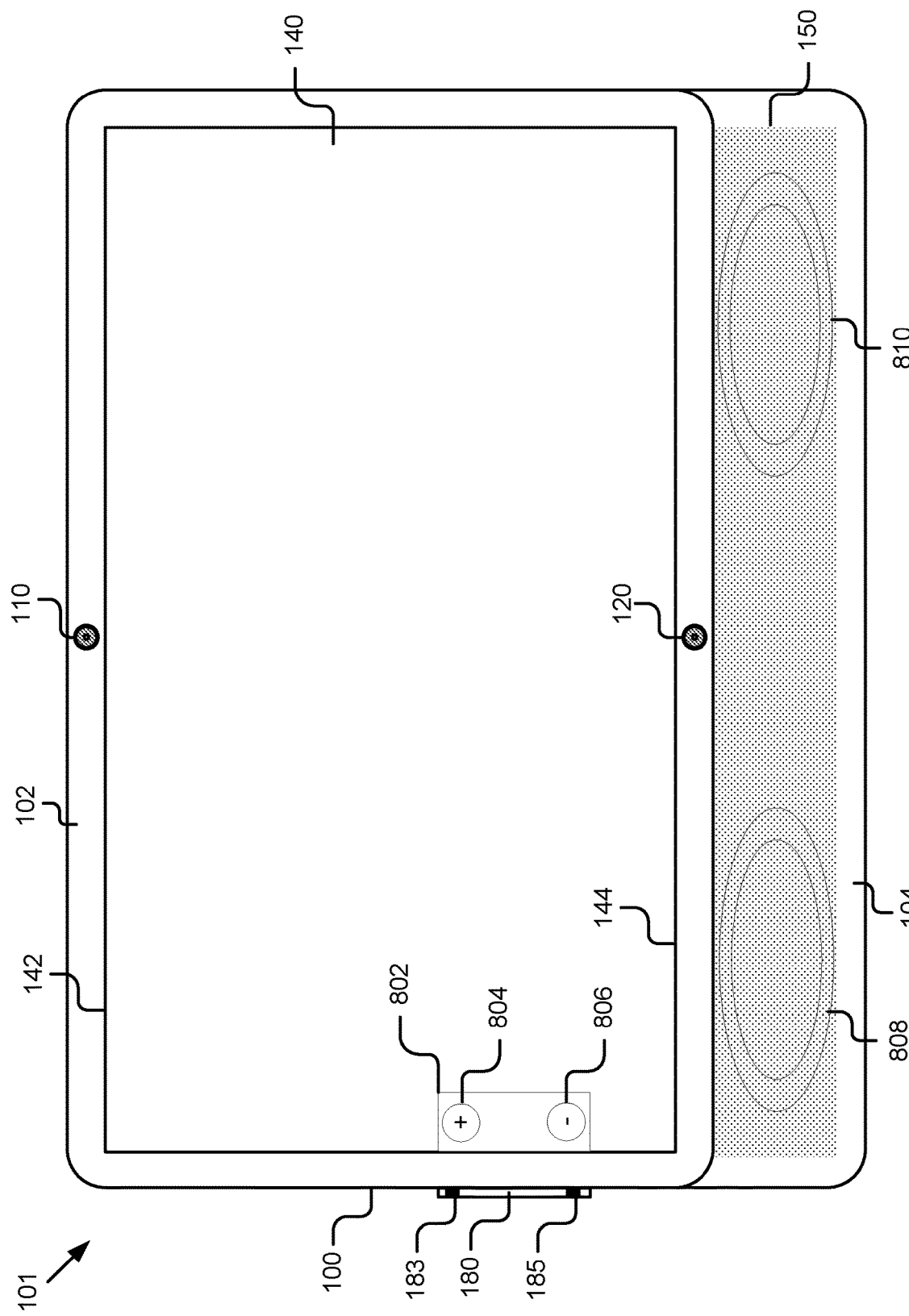
FIGS. 8A and 8B illustrate different orientations of the computing device.

FIG. 8A shows a computing device 100 in the first orientation 101. In this example, an input device 180 (also referred to elsewhere herein as the volume control 180) representing a volume control may be shown. The input device 180 may be coupled to a surface of the housing of the computing device 101, such as a side edge, although it should be understood that the input device 180 may be positioned anywhere on the housing of the computing device 101. In some implementations, the input device 180 may include two or more selection mechanisms, such as a first selection mechanism 183 and a second selection mechanism 185 (also referred to elsewhere herein as the volume up button 183 and the volume down button 185) that may be actuated to adjust a setting of an output of an application displayed on the computing device. An orientation sensor 522 may be able to determine which physical orientation the housing and display screen are positioned in and change an input polarity of the input device 180 to correspond to the determined physical orientation of the display screen, as described elsewhere herein.

Figure 8B:
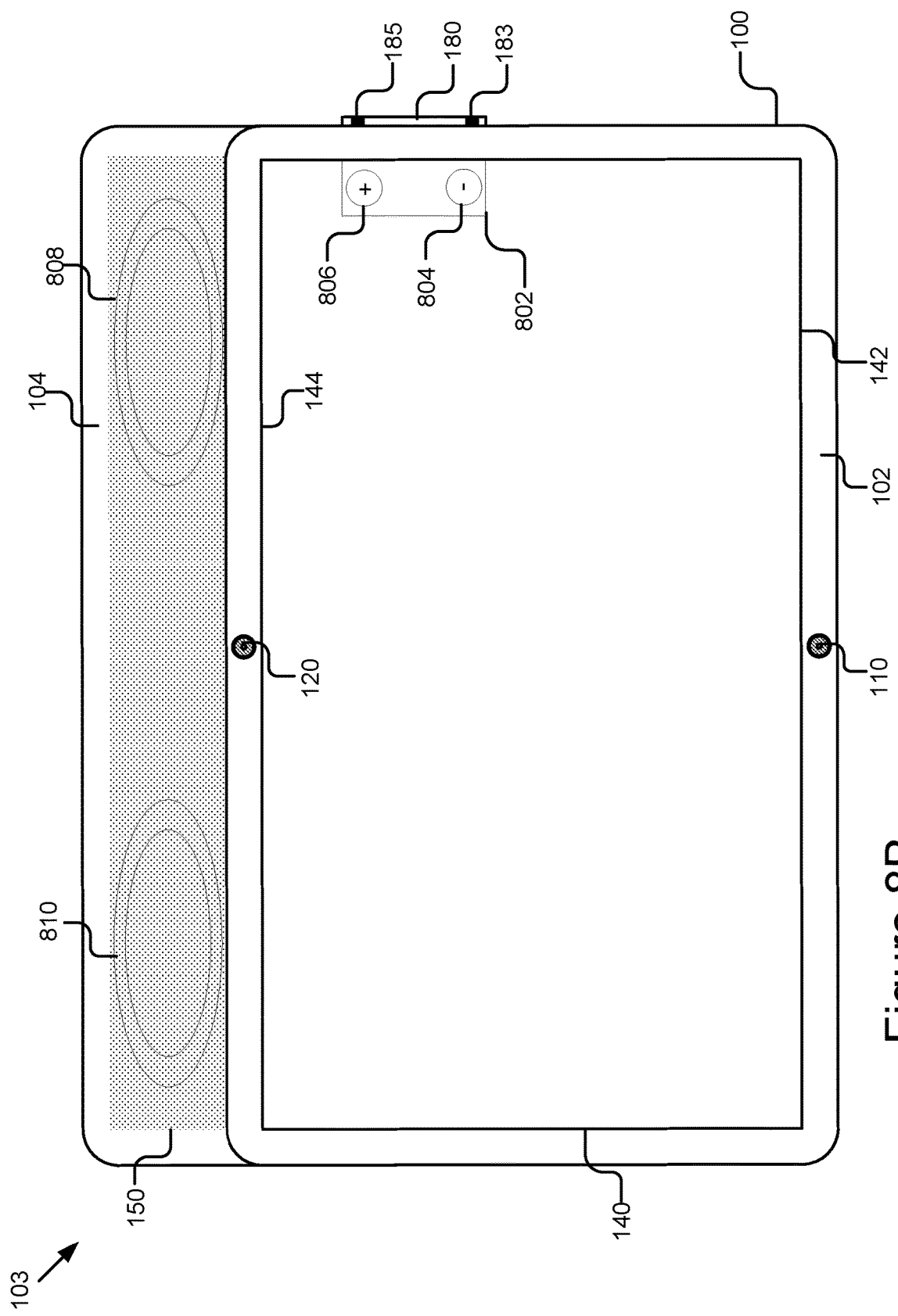

The input polarity relates to how the input affects the setting based on the orientation. For example, in the first orientation 101, the top selection mechanism 183 may be pressed to increase a volume and the bottom selection mechanism 185 may be pressed to decrease the volume. However, when the computing device is rotated and repositioned in the second orientation 103, as shown in FIG. 8B, the input device 180 has been flipped relative to the user, however, the input polarity of the input device 180 can also be adjusted such that when the user pressed the selection mechanism 185 (that was the decrease in the first orientation 101) it may cause the volume or other setting to be increased in the second orientation 103. Similarly, the selection mechanism 183 decreases the volume setting in the second orientation 103 compared to increasing the volume in the first orientation 101. This allows a user to intuitively press a top button to increase the volume and a bottom button to decrease the volume (or change other settings) independent of the orientation of the computing device. In some implementations, the input device 180 may be able to adjust the polarity of the input in order to intuitively change a variety of settings, including volume setting, brightness setting, screen dimension setting, input sensitivity setting, a zoom or magnification setting, etc.

As shown in FIG. 8A, a virtual volume interface 802 may be displayed virtually on the display screen 140. The virtual volume interface 802 may slidably appear along an edge of the display screen 140 that corresponds to where the volume control 180 is located on the edge of the computing device 100. In some implementations, the volume control 180 may include a volume up button 183 and a volume down button 185 that a user may selectively press in order to change the volume of the audio in the audio output 160. In some implementation, the volume control 180 may be discretely positioned and have a minimal profile to not distract the user from the operation of the computing device 100. By creating the minimal profile, a reminder in the form of the volume interface 802 may be presented on the display screen 140 in order to signal to the user how to operate the volume control 180. A virtual volume up button 804 and a virtual volume down button 806 may be displayed when a user's finger is proximate to the volume control 180. For example, a proximity sensor, such as a touch sensor or a light sensor may be installed in/near the volume control 180 and when the proximity sensor detects that the user is interacting with the volume control 180, the volume interface 802 may be displayed to signal to the user how to interact with the volume control 180. In further implementations, the first camera 110 or the second camera 120 may include a field of view that includes the volume control 180 and when the detector 504 detects that a user is trying to interact with the volume control, the volume interface 802 may be displayed. In some implementations, the user may also interact with the virtual volume interface 802 rather than the volume control 180 and if the display screen 140 detects a touch interaction with the volume interface 802, the computing device 100 may cause the volume to be changed based on the interaction with the virtual volume interface 802.

In some implementations, as shown in FIG. 8A, the audio output device 150 may include two or more audio outputs devices such as a first speaker 808 and a second speaker 810. The audio output may control what is being output by the first speaker 808 and the second speaker 810 in order to create a stereo sound output as controlled by the activity application(s) 414. In the first orientation 101, the first speaker 808 outputs sound from the left side of the computing device 100 and the second speaker 810 outputs sound from the right side of the computing device 100. In further implementations, a user can couple different audio output options, such as a pair of headphones or Bluetooth headphones and the activity application(s) 414 may send the left channel audio and the right channel audio to the correct audio output, such as the left ear headphone and the right ear headphone. In some implementations, the audio stream may be split, such as when two users are interacting with the computing device and the first user may have a first audio output correlating to the first speaker 808 and the second user may have a second audio output correlation to the second speaker 810 or corresponding audio output device. For example, a teacher may be using a headset paired to the output of the second speaker 810 and a student may be listening to the audio output from the first speaker 808. The output to the teacher may be presented simultaneously through the headphones while the student can hear the output channel going to the first speaker 808. This would allow private information, such as whether or not answers being input by the student are correct for the teacher to hear without disrupting the student.

As shown in FIG. 8B, when the computing device 100 is oriented in the second orientation 103, the location of the volume control 180 and/or the audio output 150 is changed relative to the display screen 140. In some implementations, the activity application(s) 414 may control the polarity of the inputs and outputs based on the orientation. For example, as shown in FIG. 8B, when the computing device 100 is orientated in the second orientation 103, the volume control 180 is located on a right side of the computing device 100. In this implementation, the volume up button 185 may be located on top portion of the volume control 180 and the volume down button 183 may be located on a bottom portion of the volume control 180. Similarly, the volume interface 802 may be located proximate to the edge of the computing device where the volume control 180 is situated and the volume interface 802 may be adjusted such that the volume up indicator 806 is still on a top portion of the volume interface 802 and a volume down indicator 804 is still in a bottom portion of the volume interface 802 even though the screen has changed positions relative to where it is located in the first orientation 101. The activity application(s) 414 may identify in the software commands for volume up and volume down, which input controls the hardware based on the orientation of the computing device 100. The activity application(s) 414 may be configured to update the mapping of the volume controls based on how the computing device 100 is orientated to allow for a user to always press the top of the volume control 180 to increase volume and press the bottom of the volume control 180 to decrease volume respectively. By preserving the habit, the user has to control the volume, the activity application(s) provides a more immersive experience when the computing device 100 is situated in different orientations.

In some implementations, the activity application(s) 414 may also update the audio outputs when the computing device 100 is orientated in the second position 103. For example, the first speaker 808 may be identified as the right audio output and the second speaker 810 may be identified as the left audio output by the activity application(s) 414. In further implementations, the sound quality may change based on when the speakers are located above the display screen 140 compared to below the display screen 140. An audio profile may be executed by the activity application(s) to change the audio quality when the different orientations are detected in order to improve the audio quality in the different orientations.

Figure 9:
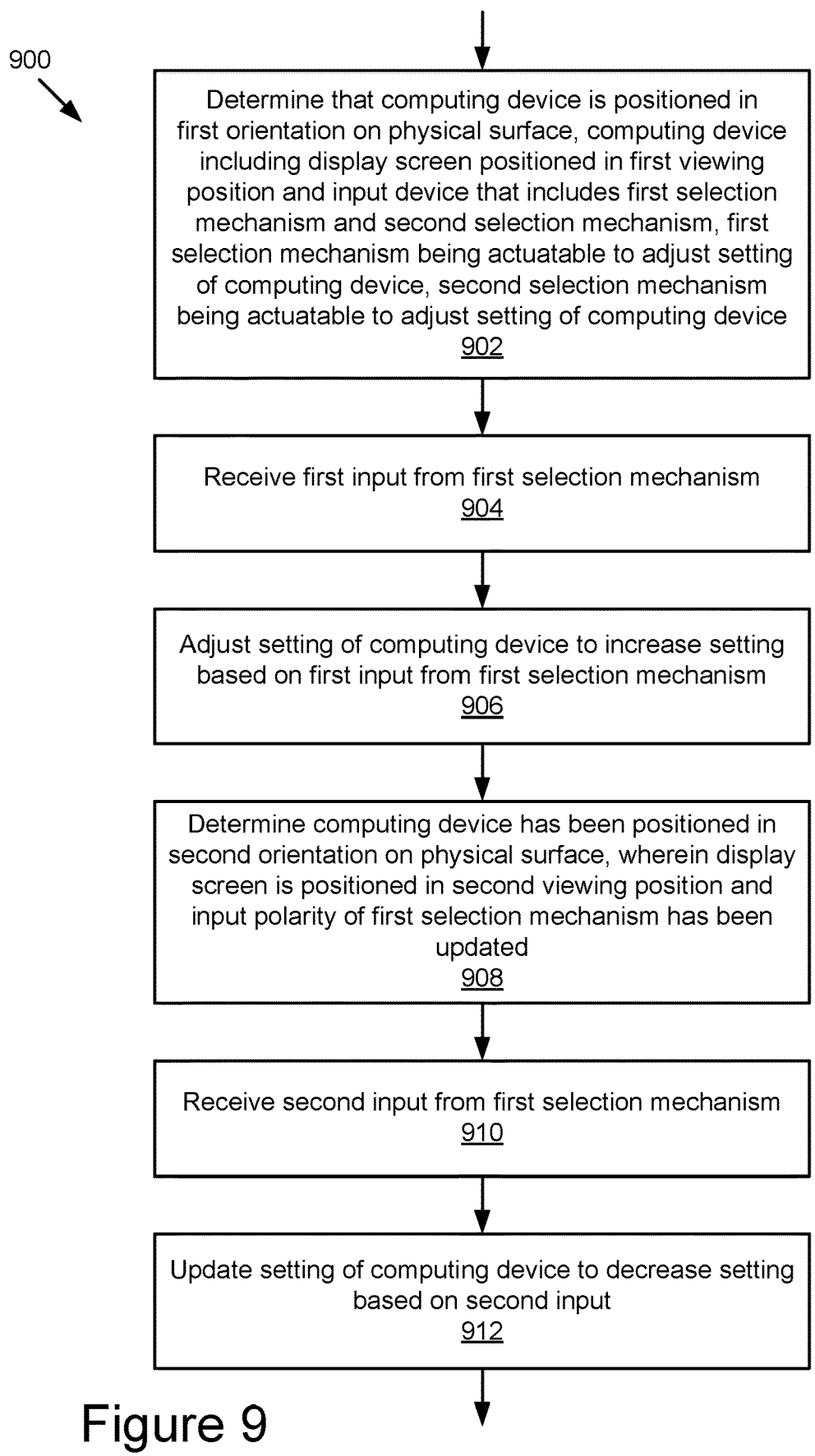
FIG. 9 depicts an example method for adjusting an input polarity.

FIG. 9 shows a method of adjusting the input polarity of an input device 180. At block 902 an orientation sensor 522 may determine that the computing device 100 is positioned in a first orientation 101 on a physical surface. The computing device 100 may include a display screen 140 positioned at a first viewing position and an input device 180 that includes a first selection mechanism 183 and a second selection mechanism 185 that may be actuated to adjust one or more settings of the computing device 100, such as a volume of the audio output or brightness of the display screen.

At block 904, the activity application 414 may receive a first input from a user selecting the first selection mechanism 183. The user may be pressing the input device 180 such as to increase or decrease the volume of the audio output. At block 906, the activity application 414 may adjust the appropriate setting of the computing device to increase the setting based on the first input from the first selection mechanism 183. In further implementations, the input device 180 may control other settings or controls, such as to advance from a first page of a presentation to a second, or navigate to a new browser window, etc.

At block 908, the activity application may determine that the computing device 100 has been positioned in the second orientation 103 on the physical surface. In the second orientation 103, the display screen is positioned in the second viewing position and the input polarity of the first selection mechanism has been updated. In some implementations, the activity application may determine and update or map the input polarity of the input device 180. For example, in a first orientation 101, the activity application 414 may identify the top button as the first selection mechanism 183 and any input from the first selection mechanism 183 in the first orientation 101 may cause the activity application 414 to increase the setting. The activity application 414 may further map the bottom button as the second selection mechanism 185 and any inputs from the second selection mechanism 185 in the first orientation 101 may cause the setting to be decreased or otherwise appropriately adjusted. In further implementations, when the orientation sensor 522 detects that the computing device 100 has been transitioned to the second orientation 103, the activity application 414 may update the mapping of the input polarity of the input device 180 such that the first selection mechanism 183 now decreases the setting and the second selection mechanism 185 now increases the setting when they are actuated.

At 910, the activity application may receive a second input from the first selection mechanism 183 which is now positioned in the second orientation 103. The second orientation 103 may cause the input polarity of the first selection mechanism 183 to be updated as described elsewhere herein.

At block 912, the activity application 414 causes the computing device 100 to update the setting to be decreased based on the second input. For example, the first selection mechanism 183 may now be used to decrease the audio volume, etc. In some implementations, a single selection mechanism 183 may be included in the input device 180 and a user may adjust the volume by both changing the orientation and pressing the single selection mechanism 183 in order to change the input polarity of the selection mechanism 183 and causing it to perform one of two different functions based on the orientation.

It should be understood that the above-described example activities are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computing device comprising:
   a housing including a display screen on a front surface;
   an input device that includes a first selection mechanism and a second selection mechanism, the first selection mechanism being actuatable to adjust a setting of an output of an application displayed on the display screen, the second selection mechanism being actuatable to adjust the setting of the output of the application displayed on the display screen; and
   an orientation sensor configured to detect a change in a physical orientation of the display screen, change a first input polarity of the first selection mechanism responsive to the change in the physical orientation of the display screen, and cause the display screen to display a virtual setting interface oriented on the display screen proximate to the first selection mechanism responsive to the change in the physical orientation of the display screen, the virtual setting interface dynamically indicating the input polarity of the first selection mechanism.

2. The computing device of claim 1, wherein the orientation sensor is further configured to change a second input polarity of the second selection mechanism responsive to the change in the physical orientation of the display screen.

3. The computing device of claim 2 wherein: when the display screen is situated in a first orientation, the display screen is situated in a first viewing position and the input polarity of the first selection mechanism is actuatable to increase the setting of the output of the application displayed on the display screen; and when the display screen is situated in a second orientation, the display screen is situated in a second viewing position and the input polarity of the first selection mechanism is actuatable to decrease the setting of the output of the application displayed on the display screen.

4. The computing device of claim 3, wherein:
   when the display screen is situated in the first orientation, the display screen is situated in a first viewing position and the input polarity of the second selection mechanism is actuatable to decrease the setting of the output of the application displayed on the display screen; and when the display screen is situated in the second orientation, the display screen is situated in a second viewing position and the input polarity of the second selection mechanism is actuatable to increase the setting of the output of the application displayed on the display screen.

5. The computing device of claim 4, wherein the setting is a volume setting and the first orientation is a substantially vertical orientation and when the display screen is situated in the first orientation, the first selection mechanism is actuatable to increase the volume setting, and the second selection mechanism is actuatable to decrease the volume setting.

6. The computing device of claim 4, wherein the setting is a volume setting and the second orientation is a substantially horizontal orientation and when the display screen is situated in the second orientation, the first selection mechanism is actuatable to decrease the volume setting, and the second selection mechanism is actuatable to increase the volume setting.

7. The computing device of claim 4, wherein:
when the display screen is situated in the first orientation, the virtual setting interface indicates that selecting the first selection mechanism will increase the setting and selecting the second selection mechanism will decrease the setting; and
when the display screen is positioned in the second orientation, the virtual setting interface indicates that selecting the first selection mechanism will decrease the setting and selecting the second selection mechanism will increase the setting.

8. The computing device of claim 7, wherein the display screen is further configured to present the virtual setting interface as a display element that slidably appears from an edge of the display screen proximate to a location of the input device on the housing.

9. The computing device of claim 3, wherein the setting is one of a volume setting, a brightness setting, a screen dimension setting, and an input sensitivity setting.

10. The computing device of claim 3, wherein the input device is a volume control device to adjust a volume of the output of the application displayed on the display screen.

11. The computing device of claim 1, further comprising:
a first audio output device; and
a second audio output device;
wherein the orientation sensor is further configured to change an audio output polarity of the first audio output device and the second audio output device responsive to the change in the physical orientation of the display screen.

12. The computing device of claim 11, wherein:
when the display screen is positioned in a first orientation, a first audio output polarity causes the computing device to send a first portion of an audio feed to the first audio output device and send a second portion of the audio feed to the second audio output device; and
when the display screen is positioned in a second orientation, a second audio output polarity causes the computing device to send the second portion of the audio feed to the first audio output device and send the first portion of the audio feed to the second audio output device.

13. A method comprising:
determining that a computing device is positioned in a first orientation, wherein the computing device includes a display screen positioned in a first viewing position;
receiving a first input via a first selection mechanism, the first selection mechanism actuatable to adjust a setting of the computing device;
adjusting the setting of the computing device to increase the setting based on the first input;
displaying a virtual setting interface oriented on the display screen proximate to the first selection mechanism responsive to the first input, the virtual setting interface dynamically indicating the first selection mechanism is configured to increase the setting;
determining that the computing device has moved to a second orientation, wherein the display screen is positioned in a second viewing position;
changing, responsive to determining that the computing device has moved to the second orientation, an input polarity of the first selection mechanism;
receiving a second input via the first selection mechanism;
adjusting the setting of the computing device to decrease the setting based on the second input; and
displaying the virtual setting interface oriented on the display screen proximate to the first selection mechanism responsive to the second input, the virtual setting interface dynamically indicating the first selection mechanism is configured to decrease the setting.

14. The method of claim 13, wherein adjusting the setting of the computing device to increase the setting based on the first input further comprises:
identifying a first input polarity mapping of the first selection mechanism based on the first orientation;
determining from the first input polarity mapping that the first selection mechanism is configured to increase the setting;
and
increasing the setting of the computing device based on the first input polarity mapping.

15. The method of claim 13, wherein adjusting the setting of the computing device to decrease the setting based on the second input further comprises:
identifying a second input polarity mapping of the first selection mechanism based on the second orientation;
determining from the second input polarity mapping that the first selection mechanism is configured to decrease the setting;
and
decreasing the setting of the computing device based on the first input polarity mapping.

16. A computing device comprising:
a housing including a display screen on a front surface, the housing and display screen being collectively positionable in one of a first orientation and a second orientation;
an input device located on a side surface of the housing, the input device including a first selection mechanism and a second selection mechanism; and
an orientation sensor configured to:
determine whether the housing and display screen are collectively positioned in the first orientation or the second orientation; and
assign an input polarity to the input device corresponding to the determined orientation, wherein:
when the housing and display screen are determined to be collectively positioned in the first orientation, the input polarity causes the first selection mechanism to increase a setting of the computing device and the second selection mechanism to decrease the setting of the computing device; and when the housing and display screen are determined to be collectively positioned in the second orientation, the input polarity causes the first selection mechanism to decrease the setting of the computing device and the second selection mechanism to increase the setting of the computing device; and cause the display screen to display a virtual setting interface oriented on the display screen proximate to the input device based on the determined orientation, the virtual setting interface dynamically indicating the input polarity of the input device.

17. The computing device of claim 16, wherein when the housing is transitioned from the first orientation to the second orientation, the orientation sensor automatically updates the input polarity of the first selection mechanism and the second selection mechanism.

18. The computing device of claim 16 further comprising:
a first audio output device;
a second audio output device; and wherein the orientation sensor is further configured to assign an audio output polarity to the first audio output device and the second audio output device corresponding to the determined orientation.

19. The computing device of claim 18, wherein:

when the housing and display screen are determined to be collectively positioned in the first orientation, the audio output polarity causes the computing device to send a first portion of an audio feed to the first audio output device and send a second portion of the audio feed to the second audio output device; and when the housing and display screen are determined to be collectively positioned in the second orientation, the audio output polarity causes the computing device to send the second portion of the audio feed to the first audio output device and send the first portion of the audio feed to the second audio output device.

20. The computing device of claim 16, wherein the display screen is further configured to present the virtual setting interface as a display element that slidably appears from an edge of the display screen proximate to the input device.

* * * * *